US012647991B2

(12) United States Patent
Bala et al.

(10) Patent No.: US 12,647,991 B2
(45) Date of Patent: Jun. 2, 2026

(54) PDCCH MONITORING REDUCTION ASSOCIATED WITH WTRU POWER SAVING

(71) Applicant: InterDigital Patent Holdings, Inc., Wilmington, DE (US)

(72) Inventors: Erdem Bala, East Meadow, NY (US); Moon-il Lee, Melville, NY (US); Paul Marinier, Brossard (CA); Janet A. Stern-Berkowitz, Little Neck, NY (US); Dylan Watts, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 517 days.

(21) Appl. No.: 17/919,408

(22) PCT Filed: Apr. 16, 2021

(86) PCT No.: PCT/US2021/027690
§ 371 (c)(1),
(2) Date: Oct. 17, 2022

(87) PCT Pub. No.: WO2021/211973
PCT Pub. Date: Oct. 21, 2021

(65) Prior Publication Data
US 2023/0180249 A1 Jun. 8, 2023

Related U.S. Application Data

(60) Provisional application No. 63/136,427, filed on Jan. 12, 2021, provisional application No. 63/061,542, (Continued)

(51) Int. Cl.
*H04W 72/23* (2023.01)
*H04W 72/1263* (2023.01)

(52) U.S. Cl.
CPC ....... *H04W 72/23* (2023.01); *H04W 72/1263* (2013.01)

(58) Field of Classification Search
CPC ......... H04W 52/0216; H04W 52/0235; H04W 52/028; H04W 72/1263; H04W 72/23; Y02D 30/70
See application file for complete search history.

(56) References Cited

U.S. PATENT DOCUMENTS

2019/0297577 A1* 9/2019 Lin .................. H04W 52/0235
2020/0092073 A1* 3/2020 Papasakellariou ...........................
H04W 72/0446

(Continued)

OTHER PUBLICATIONS

3rd Generation Partnership Project (3GPP), R1-1810976, "UE Adaptation to the Traffic for UE Power Saving", OPPO, 3GPP TSG RAN WG1 Meeting #94bis, Chengdu, China, Oct. 8-12, 2018, 8 pages.

(Continued)

*Primary Examiner* — Donald L Mills
(74) *Attorney, Agent, or Firm* — Condo Roccia Koptiw LLP

(57) ABSTRACT

The WTRU may monitor for a downlink transmission in a first monitoring occasion of a first search space. The first monitoring occasion of the first search space may be associated with a first monitoring occasion pattern. The WTRU may monitor for the downlink transmission in a second monitoring occasion of a second search space. The second monitoring occasion of the second search space may be associated with a second monitoring occasion pattern. The first search space and the second search space may belong to a search space subset. The WTRU may receive the downlink transmission in the second monitoring occasion of the second search space. The downlink transmission may include a skipping indication. Based on the WTRU receiving (Continued)

the skipping indication in the downlink transmission in the second monitoring occasion of the second search space, the WTRU may apply skipping to the second search space and the first search space.

15 Claims, 8 Drawing Sheets

Related U.S. Application Data filed on Aug. 5, 2020, provisional application No. 63/011,721, filed on Apr. 17, 2020.

(56) References Cited

U.S. PATENT DOCUMENTS

| | | | | |
|---|---|---|---|---|
| 2020/0229092 A1* | 7/2020 | Wu | ..................... | H04W 76/28 |
| 2021/0007050 A1* | 1/2021 | Lin | ..................... | H04W 76/28 |
| 2021/0058304 A1* | 2/2021 | Awoniyi-Oteri | ...... | H04L 5/0053 |
| 2022/0061033 A1* | 2/2022 | Lin | ..................... | H04L 5/0053 |
| 2023/0022171 A1* | 1/2023 | Luo | ................... | H04W 52/0219 |

OTHER PUBLICATIONS

3rd Generation Partnership Project (3GPP), R1-1902025, "UE Power Saving Schemes and Power Saving Signal/Channel", CATT, 3GPP TSG RAN WG1 Meeting #96, Athens, Greece, Feb. 25-Mar. 1, 2019, 25 pages.

3rd Generation Partnership Project (3GPP), R1-1902745, "UE Adaptation to the Traffic and UE Power Consumption", Oppo, 3GPP TSG RAN WG1 #96, Athens, Greece, Feb. 25-Mar. 1, 2019, 14 pages.

3rd Generation Partnership Project (3GPP), R1-1903344, "Discussion on UE Power Saving Schemes with Adaption to UE Traffic", CMCC, 3GPP TSG RAN WG1 #96, Athens, Greece, Feb. 25-Mar. 1, 2019, 14 pages.

3rd Generation Partnership Project (3GPP), R1-1908608, "PDCCH Skipping", CATT, 3GPP TSG RAN WG1 Meeting #98, Prague, CZ, Aug. 26-30, 2019, 5 pages.

3rd Generation Partnership Project (3GPP), R1-1911874, "Other Considerations on UE Power Saving", Huawei, HiSilicon, 3GPP TSG RAN WG1 Meeting #99, Reno, USA, Nov. 18-22, 2019, 8 pages.

3rd Generation Partnership Project (3GPP), TS 36.321 V16.0.0, "Technical Specification Group Radio Access Network, Evolved Universal Terrestrial Radio Access (E-UTRA), Medium Access Control (MAC) Protocol Specification (Release 16)", Mar. 2020, pp. 1-141.

3rd Generation Partnership Project (3GPP), TS 38.211 V16.0.0, "Technical Specification Group Radio Access Network, NR, Physical Channels and Modulation (Release 16)", Dec. 2019, pp. 1-129.

3rd Generation Partnership Project (3GPP), TS 38.212 V16.0.0, "Technical Specification Group Radio Access Network, NR, Multiplexing and Channel Coding (Release 16)", Dec. 2019, pp. 1-145.

3rd Generation Partnership Project (3GPP), TS 38.213 V16.0.0, "Technical Specification Group Radio Access Network, NR, Physical Layer Procedures for Control, (Release 16)", Dec. 2019, pp. 1-146.

3rd Generation Partnership Project (3GPP), TS 38.214 V16.0.0, "Technical Specification Group Radio Access Network, NR, Physical Layer Procedures for Data (Release 16)", Dec. 2019, pp. 1-147.

3rd Generation Partnership Project (3GPP), TS 36.331 V16.0.0, "Technical Specification Group Radio Access Network, Evolved Universal Terrestrial Radio Access (E-UTRA), Radio Resource Control (RRC), Protocol Specification (Release 16)", Mar. 2020, pp. 1-1048.

* cited by examiner

PDCCH MONITORING REDUCTION ASSOCIATED WITH WTRU POWER SAVING

CROSS-REFERENCE TO RELATED APPLICATIONS

This application is the National Stage Entry under 35 U.S.C. § 371 of Patent Cooperation Treaty Application No. PCT/US2021/027690, filed Apr. 16, 2021, which claims the benefit of Provisional U.S. Patent Application No. 63,011, 721, filed Apr. 17, 2020, Provisional U.S. Patent Application No. 63/061,542, filed Aug. 5, 2020 and Provisional U.S. Patent Application No. 63/136,427, filed Jan. 12, 2021, the disclosure of which is incorporated herein by reference in its entirety.

BACKGROUND

Mobile communications using wireless communication continue to evolve. A fifth generation may be referred to as 5G. A previous (legacy) generation of mobile communication may be, for example, fourth generation (4G) long term evolution (LTE).

SUMMARY

Systems, methods, and instrumentalities are described herein for PDCCH monitoring reduction, e.g., for wireless transmit/receive unit (WTRU) power saving. The monitoring reduction may comprise skipping monitoring occasions of configured search spaces that are in a subset.

The WTRU may monitor for a downlink transmission (e.g., a PDCCH transmission) in a first monitoring occasion of a first search space. The first monitoring occasion of the first search space may be associated with a first monitoring occasion pattern. The WTRU may monitor for the downlink transmission (e.g., the PDCCH transmission) in a second monitoring occasion of a second search space. The second monitoring occasion of the second search space may be associated with a second monitoring occasion pattern. The first search space and the second search space may belong to a search space subset. The WTRU may receive (e.g., from a network entity) the downlink transmission (e.g., the PDCCH transmission) in the second monitoring occasion of the second search space (e.g., the WTRU may not receive the downlink transmission in the first monitoring occasion of the first search space). The downlink transmission may include a skipping indication. Based on the WTRU receiving the skipping indication in the downlink transmission in the second monitoring occasion of the second search space, the WTRU may apply skipping to the second search space and the first search space. The skipping that is applied to the second search space and the first search space may be in accordance with skipping duration information, where the skipping duration information may be indicated to the WTRU separately from the skipping indication or as part of the skipping indication. The skipping duration information may indicate a first skipping duration associated with the first search space and a second skipping duration associated with the second search space. The first skipping duration may be a first number of monitoring occasions, a first amount of time, or a first number of slots. The second skipping duration may be a second number of monitoring occasions, a second amount of time, or a second number of slots. Applying skipping may include applying the first skipping duration to the first search space and applying the second skipping duration to the second search space.

DETAILED DESCRIPTION

Figure 1A:
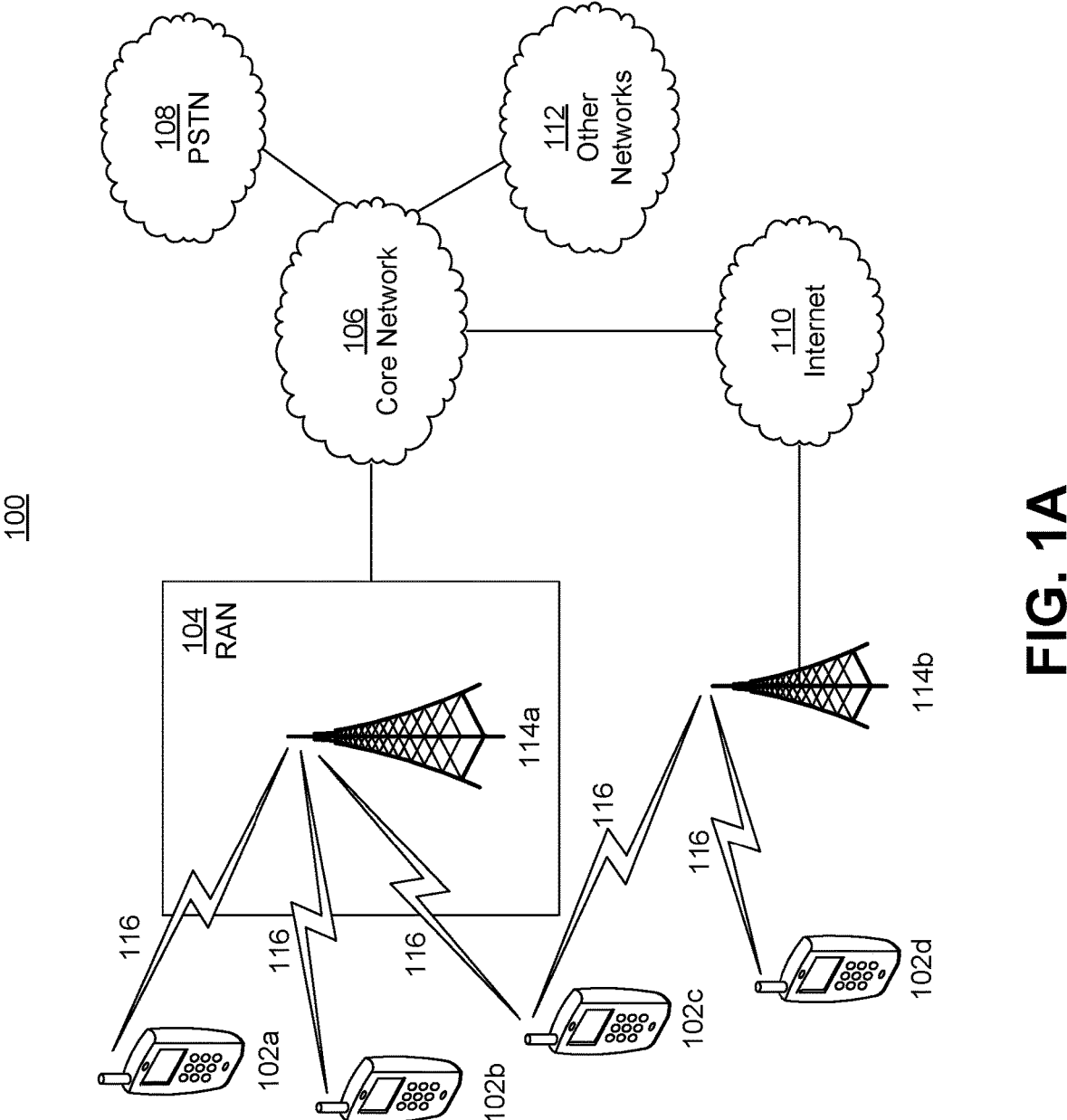
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c, and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B (eNB), a Home Node B, a Home eNode B, a gNode B (gNB), a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
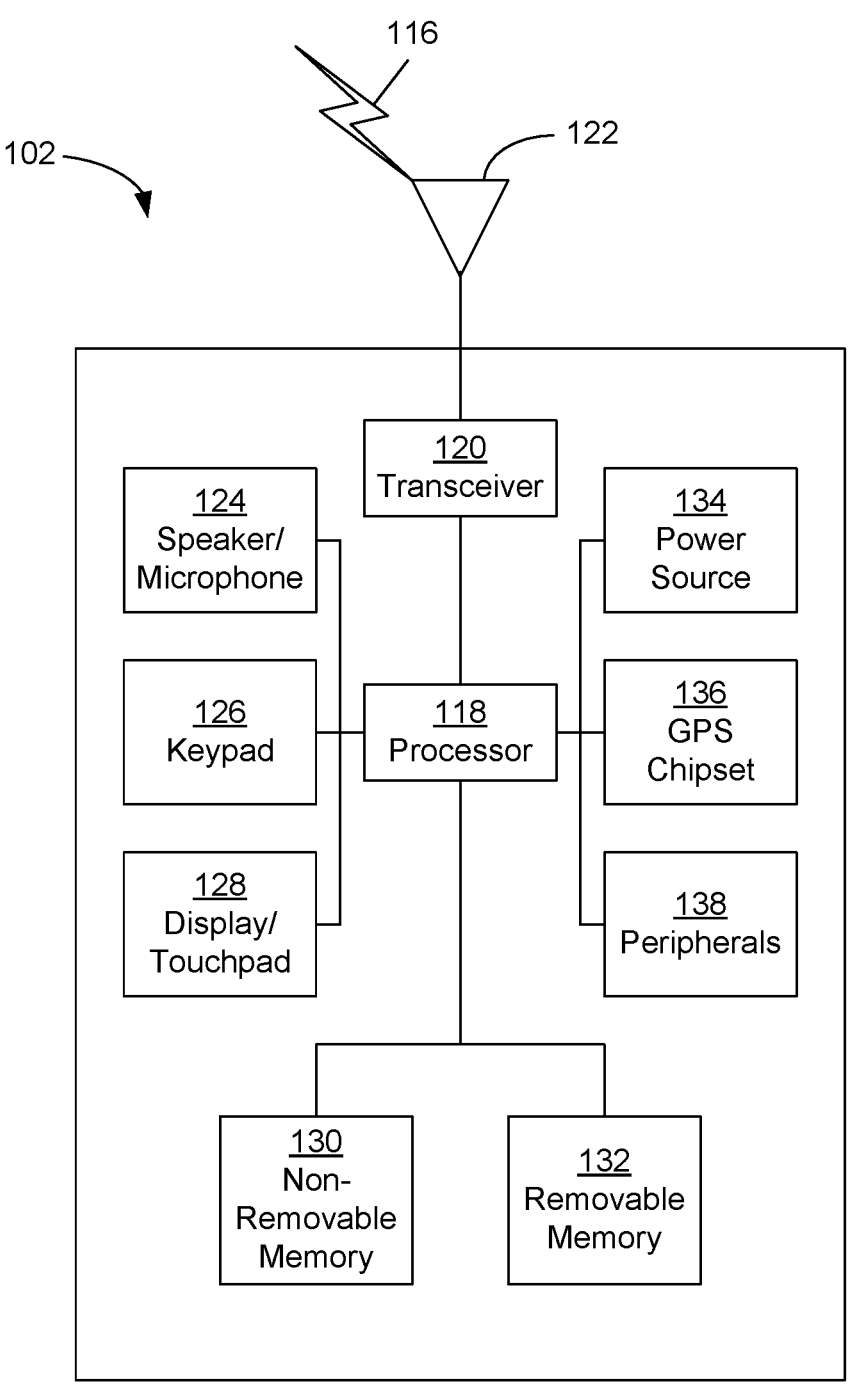
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
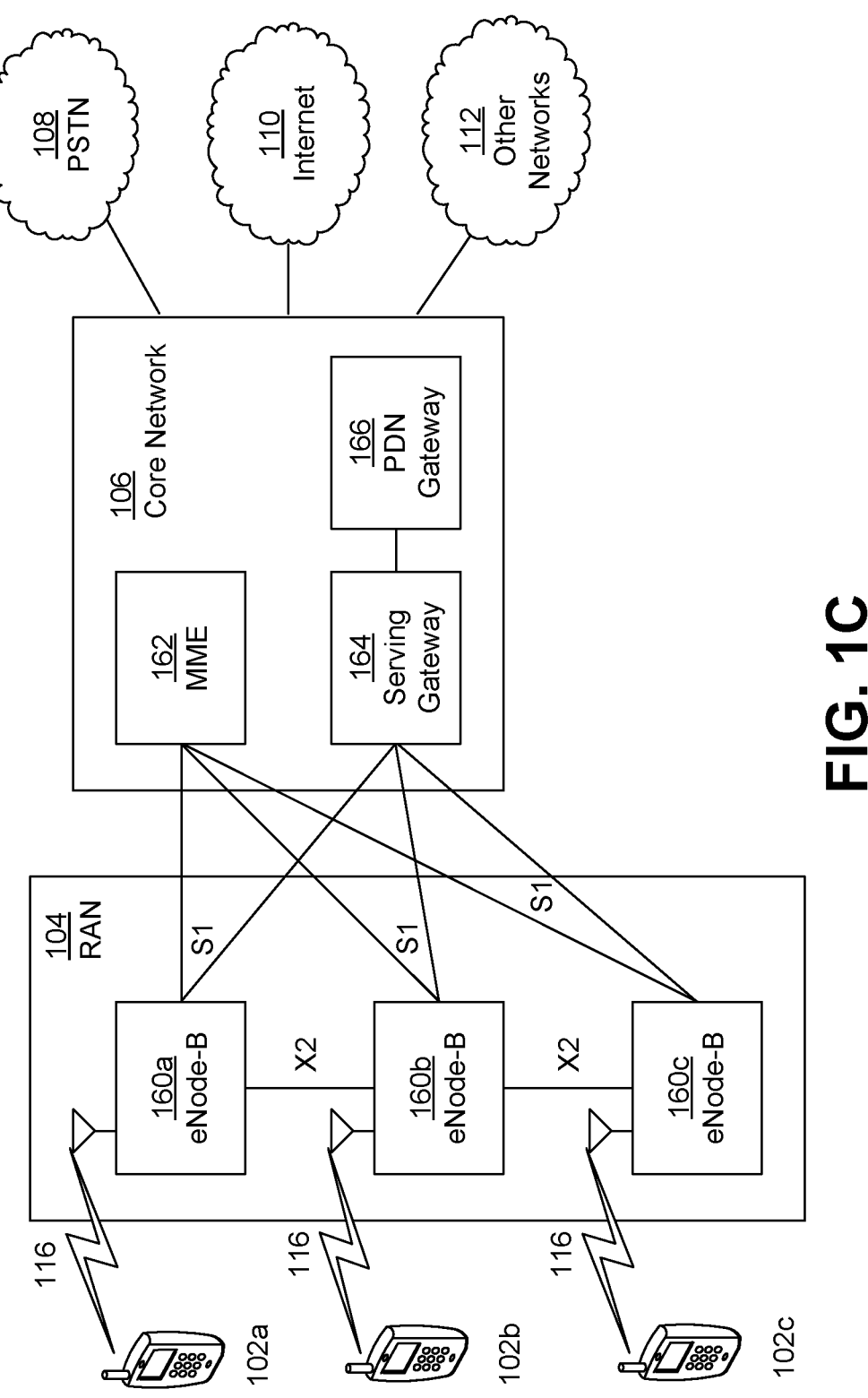
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11 ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11 ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz.

In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
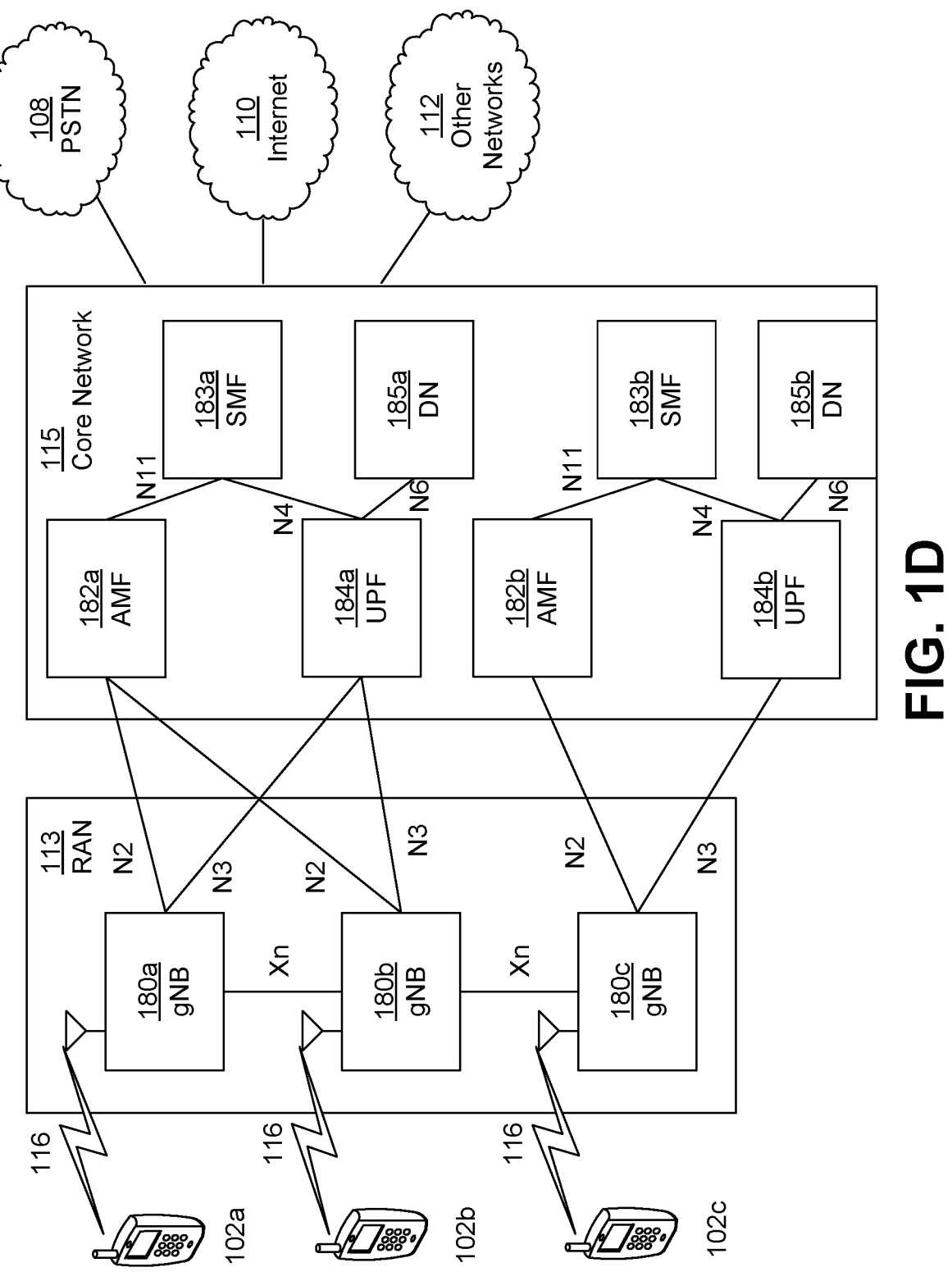
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Systems, methods, and instrumentalities are described herein for PDCCH monitoring reduction, e.g., for WTRU power saving. Monitoring occasions may be skipped and associated search spaces may be determined. Associated search spaces may be determined, for example, to monitor periodicity change(s). A set of active search spaces may be downselected from a set of configured search spaces. A (e.g., maximum) number of blind decodes may be (e.g., dynamically) reduced. PDCCH monitoring reduction indications may be received via group common signaling. Search space skipping using scheduling DCI may be provided. A unified design for SS skipping and switching may be provided.

Discontinuous reception (DRX) may be used, for example, to conserve battery power. For example, during DRX, a WTRU may not monitor a downlink (DL) control channel, e.g., physical downlink control channel (PDCCH). A WTRU may use connected mode DRX (C-DRX), for example, in radio resource control (RRC) connected mode. An example of DRX is shown in the FIG. 2.

Figures 2, 3:
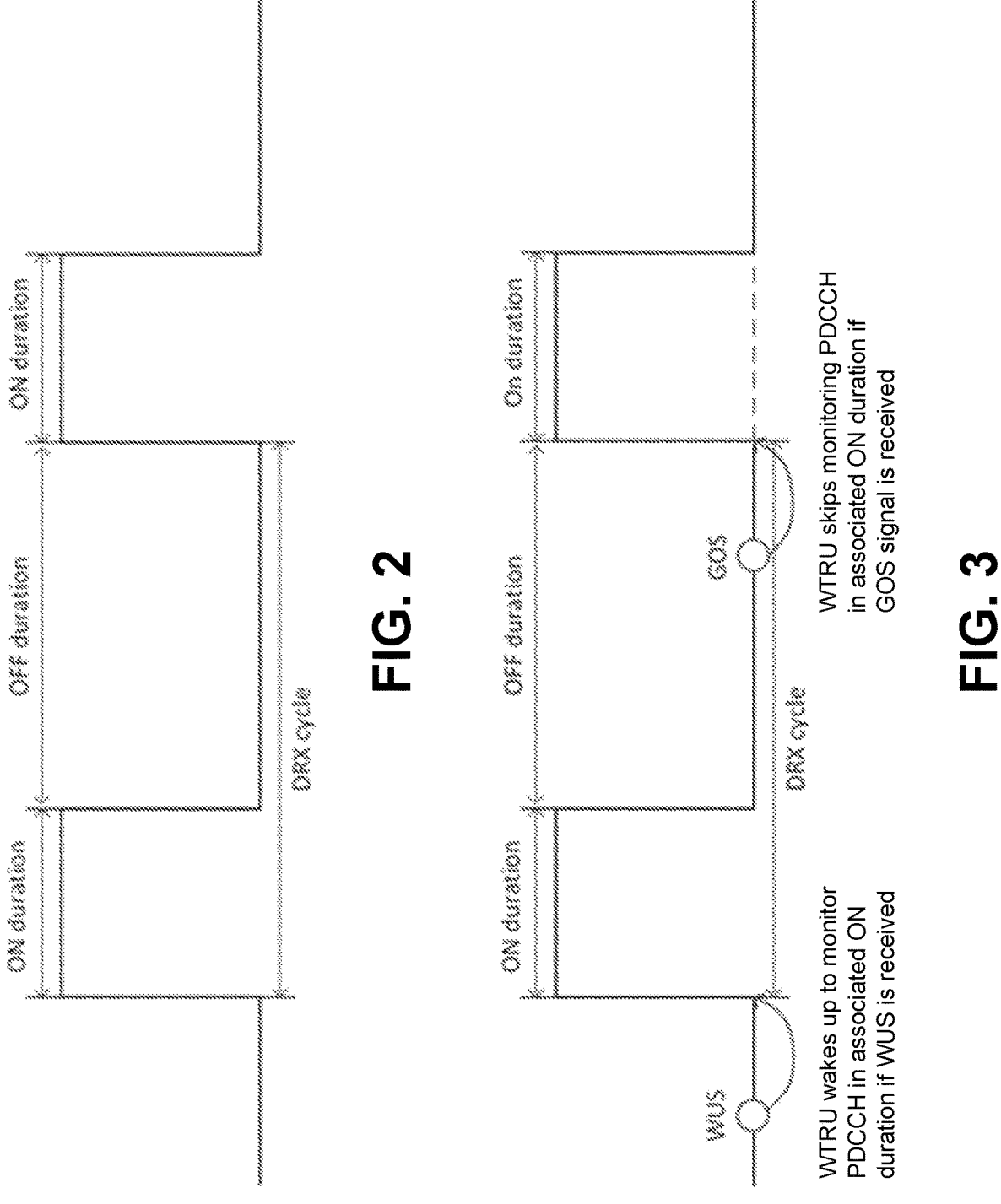
FIG. 2 is a diagram illustrating an example of ON and OFF durations in a DRX cycle.
FIG. 3 is a diagram illustrating an example of WUS and GOS in DRX operation.

FIG. 2 is a diagram illustrating an example of ON and OFF durations in a DRX cycle (e.g., to conserve battery power). A WTRU may monitor a (e.g., configured) channel (e.g., PDCCH) during an ON duration period and sleep (e.g., not monitor the PDCCH) during an OFF duration. PDCCH is a non-limiting example of a channel (e.g., a control channel) that may be monitored or not monitored during a cycle. Channel and PDCCH may be used interchangeably in examples.

A DRX cycle may be a cycle (e.g., with an aperiodic repetition or a periodic repetition) of an ON duration and an OFF duration. A WTRU may monitor a channel (e.g., one or more channels, such as PDCCH) during an ON duration and may skip monitoring a channel (e.g., one or more channels, such as PDCCH) during an OFF duration. ON duration and DRX ON duration may be used interchangeably herein. OFF duration and DRX OFF duration may be used interchangeably herein.

In examples, a DRX cycle may be a short DRX cycle or a long DRX cycle. A WTRU may use a short DRX cycle for a period of time and/or a long DRX cycle for a period of time.

Reference to a timer herein may refer to determination of a time or determination of a period of time. Reference to a timer expiration herein may refer to determining that the time has occurred or that the period of time has expired.

A time, period of time, etc. may be determined (e.g., in terms of slot duration). The time may be a time after a PDCCH occasion in which a PDCCH (e.g., a successfully decoded PDCCH) may indicate an (e.g., initial) uplink (UL) or DL user data transmission. A DRX inactivity timer may indicate or may be used to determine the time. A DRX inactivity timer may be used, for example, to determine whether and/or when to transition to an OFF duration. DRX inactivity timer and inactivity timer may be used interchangeably herein.

A DRX ON duration may be a duration at the beginning of a DRX cycle.

A number of PDCCH occasions (e.g., consecutive PDCCH occasions) may be determined. The number of PDCCH occasions may be determined using an ON duration, e.g., an ON duration timer. The determined number of PDCCH occasions may be a number of PDCCH occasions that may be or may need to be monitored or decoded (e.g., by a WTRU), for example, after waking up from a DRX cycle and/or at the beginning of a DRX cycle.

A PDCCH occasion may be a time period that may include a PDCCH transmission, e.g., the PDCCH occasion may be a symbol, a set of symbols, a slot, or a subframe.

A DRX retransmission timer may be used to determine (e.g., may determine) a number of (e.g., consecutive) PDCCH occasion(s) to monitor, for example, if a retransmission may be expected by a WTRU. A DRX retransmission timer may be used to determine (e.g., may determine) a (e.g., maximum) duration until a DL retransmission may be received and/or a (e.g., maximum) duration until a grant for UL retransmission may be received.

A DRX short cycle may be the first DRX cycle that a WTRU enters, e.g., after expiration of a DRX inactivity timer. A WTRU may be in a short DRX cycle, for example, until the expiration of a DRX short cycle timer. A WTRU may use a long DRX cycle, for example, if a DRX short cycle timer expires.

A DRX short cycle timer may be used to determine (e.g., may determine) a number of (e.g., consecutive) subframe(s) that may follow the short DRX cycle, e.g., after the DRX inactivity timer has expired.

A WTRU may (e.g., need to) monitor PDCCH and/or PDCCH occasions, for example, during an Active Time. An Active Time may occur, for example, during an ON duration. An Active Time may occur, for example, during an OFF duration. In examples, an Active Time may begin during an ON duration and may continue during an OFF duration. Active Time and Active Time of a DRX cycle may be used interchangeably herein.

An Active Time may include the time, e.g., while at least one of the following is true: (i) a DRX timer may be (e.g., is) running, e.g., where the DRX timer may be an ON duration timer, an inactivity timer, a retransmission timer (e.g., in the DL and/or the UL), and/or a random access contention resolution timer; (ii) a scheduling request is (e.g., has been) sent (e.g., on a physical uplink control channel (PUCCH)) and may be pending; (iii) or a PDCCH (e.g., indicating a new transmission addressed to a cell radio network temporary identifier (C-RNTI) of a medium access control (MAC) entity of a WTRU) may not have been received (e.g., after successful reception of a Random Access Response for the Random Access Preamble not selected by the MAC entity among the contention-based Random Access Preamble).

A DRX timer may be a timer associated with DRX. In examples, one or more of the following timers may be associated with DRX: a DRX on duration timer (e.g., drx-onDurationTimer); a DRX inactivity timer (e.g., drx-InactivityTimer); a DRX DL retransmission timer (e.g., drx-RetransmissionTimerDL); a DRX UL retransmission timer (e.g., drx-RetransmissionTimerUL); a DRX hybrid automatic repeat request (HARQ) round trip time (RTT) timer for UL (e.g., drx-HARQ-RTT-TimerUL); or a DRX HARQ RTT timer for DL (e.g., drx-HARQ-RTT-TimerDL).

A DRX inactivity timer may be a duration after a PDCCH occasion, e.g., in which a PDCCH transmission indicates an initial UL or DL user data transmission for a MAC entity. A DRX DL retransmission timer (e.g., per DL HARQ process) may be a duration (e.g., a maximum duration), e.g., until a DL retransmission is received. A DRX UL retransmission timer (e.g., per UL HARQ process) may be a duration (e.g., a maximum duration), e.g., until a grant for UL retransmission is received. A DRX HARQ RTT timer for UL (e.g., per UL HARQ process) may be a duration (e.g., a minimum duration), e.g., before a UL HARQ retransmission grant may be expected by a WTRU or MAC entity. A DRX HARQ RTT timer for DL (e.g., per DL HARQ process) may be a duration (e.g., a minimum duration), e.g., before a DL assignment for HARQ retransmission may be expected by the WTRU or MAC entity.

A wake-up signal (WUS) and/or a go-to-sleep signal (GOS) (WUS/GOS) may be used, for example with a DRX operation. A WUS/GOS may be associated with one or more DRX cycles. A WUS/GOS may be transmitted and/or received, for example, prior to an associated time or part of a DRX cycle (e.g., an associated DRX cycle).

FIG. 3 is a diagram illustrating an example of WUS and GOS used with a DRX operation. A WTRU may monitor for a PDCCH transmission in ON durations for one or more DRX cycles, for example, if a WTRU receives a wake-up indication. A WTRU may skip monitoring for a PDCCH transmission in ON durations for one or more DRX cycles and may stay in a sleep mode (e.g., a deep sleep mode), for example, if a WTRU receives a go-to-sleep or not-wake-up indication.

A WTRU may be configured to monitor downlink control information (DCI) (e.g., DCI Format 2_6), for example, in a common search space, e.g., before an ON duration. A WTRU may receive an indication (e.g., a 1-bit flag, such as ps-WakeupOrNot), for example, to indicate whether the WTRU may or may not start an Active Time (e.g., indicated by a drx-onDurationTimer) for the next DRX cycle. A WTRU may not start an Active Time (e.g., indicated by a drx-onDurationTimer) for the next DRX cycle, for example, if the WTRU is not provided with an indication (e.g., 1-bit flag, such as ps-WakeupOrNot).

New radio (NR) PDCCH and search spaces may be provided (e.g., implemented). In examples, a resource element group (REG) may be a building block (e.g., a smallest building block) for a PDCCH. A REG (e.g., each REG) may include12 resource elements (Res) on an OFDM symbol in time and a resource block (RB) in frequency. In a REG (e.g., each REG), nine (9) resource elements (Res) may be used for control information and three (3) Res may be used for a demodulation reference signal (DM-RS). Multiple REGs (e.g., 2, 3, or 6) (e.g., which may be adjacent in time or frequency) may form a REG bundle. The REG bundle may be used, for example, with a precoder (e.g., a same precoder). The DM-RSs of the multipleREGs in the REG bundle may be used (e.g., together) for channel estimation. In examples, six (6) REGs (e.g., in the format of 1, 2, or 3 REG bundles) may form a control channel element (CCE). The CCE may be the smallest possible PDCCH. A PDCCH (e.g., each PDCCH) may include one or more CCEs (e.g., 1, 2, 4, 8, or 16 CCEs). The number of CCEs for a PDCCH may be referred to as an aggregation level (AL) of the PDCCH.

REG bundles may be mapped (e.g., using interleaving or non-interleaving mapping). In examples (e.g., for non-interleaving mapping), consecutive REG bundles (e.g., adjacent in frequency) may form a CCE. CCEs adjacent in frequency may form a PDCCH. In examples (e.g., using interleaving mapping), REGs may be interleaved (e.g., and/or permuted), for example, before being mapped to CCEs, which may result in (e.g., generally) non-adjacent REG bundles in a (e.g., one) CCE and non-adjacent CCEs in a (e.g., one) PDCCH.

A control resource set (CORESET) may be configured by or may comprise at least one of the following: (i) a frequency assignment (e.g., as chunks of multiple RBs, such as 6 RBs); (ii) a length in time (e.g., one or more, such as 1-3, OFDM symbols); (iii) a type of REG bundle; or (iv) a type of mapping from REG bundles to CCEs (e.g., interleaving or non-interleaving mapping). In a bandwidth part (BWP) (e.g., each BWP), there may be up to N (e.g., 3) CORESETs. For example, there may be 12 CORESETs in four (4) possible bandwidth parts.

A WTRU may monitor a set of PDCCH candidates or may be assigned with a set of PDCCH candidates (e.g., to monitor). A set of PDCCH candidates may be monitored, for example, during a blind detection of PDCCH. A search space or a set of search spaces (e.g., for multiple aggregation levels) may be or may include a set of PDCCH candidates (e.g., to monitor, such as with blind detection). A search space, each search space, or set of search spaces may be configured, for example, by at least one of the following: (i) an associated CORESET; (ii) a number of candidates for or within each aggregation level; or (iii) a set of monitoring occasions. Monitoring occasions may be determined, for example, by one or more of the following: a monitoring periodicity (e.g., in terms of slots), a monitoring offset, or a monitoring pattern (e.g., with multiple bits (e.g., 14 bits) corresponding to the possible patterns of symbols inside a slot).

A function that may contribute to WTRU power consumption may be control channel monitoring during active time (e.g., for control channels, such as PDCCH and side-link control channel). A WTRU may (e.g., have to) wake up and perform procedures (e.g., channel estimation, channel decoding, demodulation, etc.), for example, to detect one or more PDCCH monitoring candidates in a PDCCH monitoring occasion (e.g., in each PDCCH monitoring occasion). Such procedures (e.g., performed by a WTRU) may cause power consumption, which may increase, for example, if the procedure(s) are performed frequently (e.g., every slot) and/or if the number of PDCCH candidates is large. A WTRU may be enabled (e.g., configured) to save power (e.g., battery power), for example, while monitoring control channel candidates.

A WTRU may reduce PDCCH monitoring, for example, by (i) not monitoring for a PDCCH transmission in one or more time instances (e.g., configured and/or selected time instances), and/or (ii) adapting the monitoring periodicity. A WTRU may need to determine the time instances when not to monitor for a PDCCH transmission (e.g., when reducing PDCCH monitoring by not monitoring for the PDCCH transmission in one or more time stances). A WTRU may need to determine how search space monitoring occasions may be impacted (e.g., when reducing PDCCH monitoring by adapting monitoring periodicity).

A WTRU may be enabled to save power, e.g., by determining to dynamically reduce the number of blind decodes and/or CCEs the WTRU monitors. A WTRU may be enabled to save power, e.g., by reducing the number of active (e.g., monitored) search spaces.

A WTRU may be configured with a control resource set (CORESET) and one or more search spaces associated with the CORESET. The CORESET configuration may include one or more of the following: one or more frequency domain resources (e.g., a set of resource blocks used for the CORESET), a number of OFDM symbols, a REG bundle size, or a CCE-to-REG mapping type. A search space configuration may include one or more of the following: associated CORESET information (e.g., CORESET-id), a search space type (e.g., common or WTRU-specific), a DCI format, monitoring slot periodicity, a number of decoding candidates (e.g., per a PDCCH aggregation level), or one or more monitoring symbols (e.g., within a slot).

A search space, a PDCCH search space, a search space monitoring occasion, and a PDCCH monitoring occasion may be used interchangeably. A PDCCH monitoring occasion may be considered to be a time instance (e.g., a slot, a subframe, a symbol). A WTRU may monitor one or more search spaces. A periodicity of a search space, a monitoring periodicity of a search space, and a PDCCH monitoring periodicity may be used interchangeably.

Monitoring a search space by a WTRU may imply that the WTRU attempt to decode one or more PDCCH candidates configured for that search space, wherein each PDCCH candidate may comprise one or more CCEs and the number of CCEs for a PDCCH candidate may be referred to as an aggregation level. A PDCCH candidate, a PDCCH decoding candidate, a PDCCH blind decoding candidate, a decoding candidate, and a blind decoding candidate may be used interchangeably.

PDCCH monitoring reduction indication(s) may be received via group common signaling. In examples, the WTRU may be configured to monitor for a PDCCH transmission carrying a DCI (e.g., a DCI format x_y). One or more information bits (e.g., k bits) within the DCI (e.g., DCI format x_y) may indicate to the WTRU to reduce monitoring of a search space. For example, the WTRU may determine, based on the k bits, whether to skip or not skip one or more monitoring occasions of a search space (e.g., future monitoring occasions of a search space). The WTRU may be configured with a number k and a location of the k bits, for example, within the bitfield of a DCI (e.g., the DCI format x_y). The WTRU may be configured with an RNTI (e.g., S-RNTI) to use in decoding the PDCCH transmission to get the DCI, e.g., DCI format x_y (e.g., the CRC of the DCI may be scrambled with the RNTI).

The WTRU may determine the number of monitoring occasions of a configured specific search space to skip (e.g., not monitor) based on the PDCCH monitoring reduction indication(s). In examples, the k bits may indicate the number of monitoring occasions of a configured specific search space to skip (e.g., not monitor). This search space may be referred to as being associated to the PDCCH and/or the DCI (e.g., DCI format x_y). The association may be based on at least one parameter of the PDCCH, at least one parameter of the DCI (e.g., DCI format x_y), at least one parameter of the search space used to monitor for the PDCCH transmission, and/or at least one parameter of the search space.

The WTRU may be configured, for example, with a list of the search spaces (SS) to which the skipping indication applies. For example, the WTRU may be configured with a number of WTRU specific SSs (e.g. 6 WTRU specific SSs (e.g., UESS 1, 2, 3, 4, 5, 6)) and a number of common SSs (e.g. 2 common SSs (e.g., CSS 1, 2)). The skipping indicated within the DCI (e.g., DCI format x_y) may apply to a first number (e.g., first 4) of the WTRU specific SSs. In examples, the WTRU may monitor for the PDCCH transmission with more than one RNTI (e.g., S1-RNTI and S2-RNTI). For example, a RNTI may indicate the SSs to which the skipping indication applies. For example, if a PDCCH transmission is detected with S1-RNTI, then the skipping indication may apply to WTRU specific SSs {1, 2, 3}. If a PDCCH transmission is detected with S2-RNTI, then the skipping indication may apply to WTRU specific SSs (4, 5} and/or group common SS {1}.

In examples, the association may be determined based on the CORESET ID. For example, the skipping indication may apply to the SSs configured on the same CORESET as the SS used to monitor for the PDCCH transmission.

In examples, the association may be determined based on the type of SS. For example, the skipping indication may apply to WTRU specific search spaces. The association may be determined with a combination of the above. For example, the skipping indication may apply to a subset of the UESSs configured for CORESET ID #.

The skipping indication may be applied, for example, by the WTRU starting at slot n+m, where n may be the slot when the PDCCH transmission may be detected. Variable k may be configured and may be an integer. The indicated skipping operation may expire when a new indication is received and/or when a timer expires (e.g., a time is reached or a time duration expires), for example. The timer may start in slot n.

For example, the skipping indication may indicate how many monitoring occasions of the associated search spaces to skip. The indication may choose the number of MOs to skip from a configured set of values.

For example, the WTRU may be configured with the number of MOs to skip as {0 and 4}. The WTRU may be configured with a PDCCH and 1 bit within the DCI (e.g., k=1). The 1-bit indication may indicate one of {0} or {4} MOs to skip. For example, if the bit is set to 1, then the number of MOs to skip may be 4. The WTRU may be configured to monitor for the PDCCH transmission with periodicity of a number of slots (e.g. 20 slots (e.g., the WTRU may monitor the PDCCH in slots 20, 40, 60, . . . )). The WTRU may be configured to monitor a WTRU specific SS (e.g., UESS 1) with periodicity of a number of slots (e.g. 6 slots (e.g., the WTRU may monitor UESS 1 in slots 6, 12, 18, 24, 30, . . . )). The WTRU may receive the PDCCH transmission in slot 20 and may determine that the 1-bit indication may be set to 1, indicating a number of MOs (e.g. 4 MOs) to skip. The WTRU may determine that the skipping indication may be associated to the UESS 1. The WTRU may skip a number of MOs (e.g. 4 MOs) of UESS 1 starting from slot 20, for example, in slots 24, 30, 36, and 42. The WTRU may not monitor UESS 1 in the skipped slots.

The WTRU may determine whether or not to skip the MOs of an associated SS based on the PDCCH monitoring reduction indication(s). In examples, the k-bit may indicate to skip MOs (e.g., all the MOs) of an associated SS until the next indication is received and/or a timer expires (e.g., a time is reaches, a time duration expires, etc.). The WTRU may be configured with one or more MO skip configuration(s).

In an example configuration, the WTRU may expect to receive a PDCCH transmission in every configured MO for the PDCCH. If the PDCCH transmission is not detected in a MO (e.g., due to low SINR), the WTRU may in slot n+m (where n is the slot where the WTRU expects to receive the PDCCH) start and/or continue monitoring all associated SSs with their original configured monitoring periodicities.

In an example configuration, if a PDCCH transmission is not received in a configured MO for the PDCCH, the WTRU may continue applying the latest skipping indication to the associated SSs.

Although the examples provided herein have been presented for skipping operation, examples may apply to operations such as changing the periodicity of an associated search space. For example, the WTRU may be configured with a number of periodicities (e.g. two periodicities) for a search space, e.g., periodicities {1, 8} slots. In examples, one of the periodicities may be configured to be the default periodicity.

The k-bit indication may indicate to the WTRU to apply the indicated periodicity to the associated search spaces. In examples, the same k-bit may indicate to the WTRU to change the periodicity of more than one SS. For example, the WTRU may be configured with a number of SSs (e.g. two SSs) with periodicities of {1, 4} and {2, 8} slots. Using a 1-bit indication, the WTRU may determine to apply the first periodicities of {1} and {2} for the respective SSs (e.g., when the 1 bit indication is set to 0) and the WTRU may determine to apply the second periodicities of {4} and {8} for the respective SSs (e.g., when the 1 bit indication is set to 1).

The indication may be valid until a new indication is received and/or a timer expires (e.g., a time is reached, a time duration expires, etc.). If an indication is not received in an expected MO, then the WTRU may (1) start or continue using the default periodicities for the associated SSs or the WTRU may (2) continue using periodicities indicated in the latest indication. Whether (1) and/or (2) applies may be configured.

Although in the examples provided herein, it is presented that the WTRU may be indicated to skip a number of monitoring occasions, examples may apply if the WTRU may be indicated to skip a number of slot, frames, subframes, OFDM symbols, etc. For example, if the WTRU may be indicated to skip M slots, then the WTRU may not be expected to monitor the associated SSs during the interval indicated by the M slots (e.g., from slot n+1 to slot n+M where the indication is received in slot n).

A WTRU may skip one or more monitoring occasions. In examples, a WTRU may receive an (e.g., explicit and/or implicit) indication to skip one or more search space monitoring occasions (MOs). Skipping one or more MOs (MO skipping) may be mandatory or permissive (e.g., a WTRU shall not monitor, or the WTRU may be allowed to skip monitoring for a PDCCH transmission during the skipped monitoring occasion(s)). In examples, bits transmitted in a control channel (e.g., DCI, SCI, etc.) may indicate an amount of time a WTRU may (e.g., must) skip. The amount of time may be, in terms of a number of monitoring occasions. The amount of time the WTRU skips may be in terms of one or more of the following: a number of slots, a number of seconds/milliseconds, a number of OFDM slots, etc.

Single MO skipping may be implemented. In examples, a WTRU may (e.g., may receive an indication to) skip monitoring a number of MOs (e.g., one or more MOs), for example in a single instance, which may be referred to as single MO skipping (or one-shot skipping). An indication may be explicit (e.g., from DCI) and/or implicit (e.g., based on one or more conditions).

In examples (e.g., for an explicit indication), one or more bits (e.g., 1 bit) within a DCI may indicate (e.g., to a WTRU) to skip a (e.g., one) of multiple (e.g., two) configured monitoring occasions. For example, a configuration may include {0, M}, which may indicate one of two options (e.g. depending on the value of the bit), for example, skipping M monitoring occasions or skip zero (0) monitoring occasions (e.g., no skipping). M may be determined, for example, as a function of subcarrier spacing and/or a bandwidth part (BWP) identifier (ID). In examples, multiple bits may be used to indicate (e.g., to a WTRU) to skip a (e.g., one) of multiple configured monitoring occasions. For example, two bits may (e.g., selectively) provide four MO skipping indications, such as skipping {0, M1, M2, M2} monitoring occasions.

In examples (e.g., for an implicit indication), an MO may be skipped, for example, if one or more following conditions is/are met: (i) a number of PDCCH candidates in the MO may be less than a threshold (e.g., or larger than a threshold; (ii) a number of non-overlapped CCEs (e.g., to decode or monitor in the MO) may be less than a threshold (e.g., or larger than a threshold); (iii) a WTRU may be configured with a power saving mode; (iv) a WTRU received a scheduling grant (e.g., a physical downlink shared channel (PDSCH) or physical uplink shared channel (PUSCH) transmission) in a previous MO (e.g., the latest MO) or the previous K MOs (e.g., the latest K MOs), where K may be a predefined positive integer number or a configured number; (v) a HARQ process number may be indicated in a previous scheduling of a PDSCH transmission or PUSCH transmission (e.g., the latest MO).

Figures 4, 6:
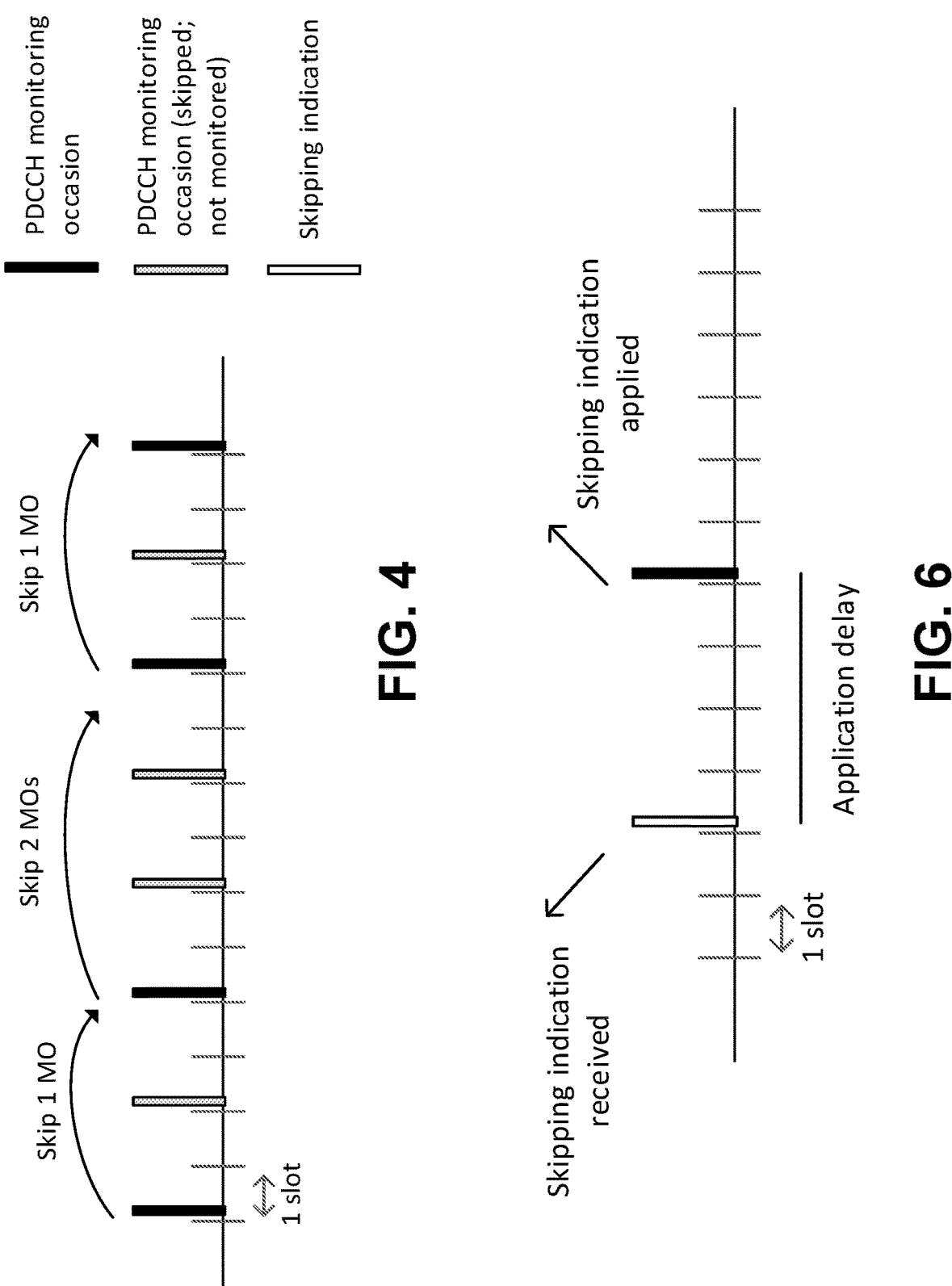
FIG. 4 is a diagram illustrating an example of skipping monitoring occasions (MOs).
FIG. 6 is a diagram illustrating an example of an application delay.

Multiple MO skipping (e.g., pattern skipping) may be implemented. In examples, one or more DCI bits may indicate a skipping pattern. A skipping pattern may include and/or indicate a pattern of monitoring occasions (MOs) to skip. FIG. 4 is a diagram illustrating an example of skipping multiple monitoring occasions according to a skipping pattern. For example, one or more DCI bits may indicate skipping {1, 2, 1} monitoring occasions, e.g., as shown by example in FIG. 4. Monitoring periodicity may be any value. Monitoring periodicity may be (e.g., as shown by example in FIG. 4) one (1) slot. A monitoring periodicity of one slot may mean that a WTRU may monitor for a PDCCH transmission in every slot (before skipping is applied), e.g., as shown by example in FIG. 4.

A WTRU may receive an indication, for example, to apply one-shot skipping and/or pattern skipping multiple times (e.g., M times). A WTRU may be configured, for example, to monitor for a PDCCH transmission with periodicity of four (4) slots. The WTRU may receive an indication, for example, to apply one-shot skipping multiple times (e.g., starting from slot n). The WTRU may monitor for the PDCCH transmission, for example, as follows: monitor slot n, skip monitoring slot n+4, monitor slot n+8, skip monitoring slot n+12, etc. The number M may be configured, signaled, and/or determined, for example, by the expiry of a timer (e.g., expiry of a time duration). The WTRU may continue skipping until the timer expires).

In examples, a DCI may indicate skipping monitoring occasions. In examples, a DCI may indicate a number of slots and/or OFDM symbols to skip. For example, a bit (e.g., one bit) within a DCI may indicate (e.g., to a WTRU) to skip a configured slot, e.g., one of multiple (e.g., 2) configured slots. For example, a configuration may include {0, L}. A (e.g., one) bit (e.g., depending on a value of the bit) may indicate (e.g., to a WTRU) to skip L slots or 0 slots (e.g., no skipping). L may be determined, for example, as a function of subcarrier spacing and/or bandwidth part (BWP) ID. Pattern skipping may be applied (e.g., similarly in terms of slots and/or OFDM symbols).

In examples, Ns bits (e.g., an MO skipping indication) may be used, configured, and/or determined, for example, to indicate the skipping of one or more MOs in a control channel. A code point of Ns bits (e.g., each code point of Ns bits) may indicate a set of associated MOs (e.g., for MO skipping). One or more of following may apply.

Associated MOs (e.g., for MO skipping) may be determined, for example, based on at least one of following: a periodicity of PDCCH reception for MO skipping indication and/or a DRX configuration. Associated MOs (e.g., for MO skipping) may be determined, for example, based on a periodicity of PDCCH reception (e.g., for MO skipping indication). A WTRU may be configured, for example, with one or more search spaces and an associated CORESET for a DCI (e.g., carrying an MO skipping indication). The MOs within the periodicity may be the associated MOs (e.g., for MO skipping). Associated MOs (e.g., for MO skipping) may be determined, for example, based on a DRX configuration. In examples, the MOs (e.g., or a subset of MOs) within an Active time may be the associated MOs. In examples, the MOs (e.g., or a subset of MOs) in an ON duration may be the associated MOs.

A code point of Ns bits (e.g., each code point of Ns bits) may be configured, for example, with a set of MOs for MO skipping. A first code point of Ns bits may indicate no skipping of the associated MOs. A second code point to the last code point, may be configured to indicate a set of MOs to skip monitoring. In examples, a MO in the associated MOs (e.g., each MO in the associated MOs) may be numbered or indexed in an increasing order.

A code point of Ns bits (e.g., each code point of Ns bits) may include a set of MO numbers or indexes to skip monitoring. A (e.g., each) code point of Ns bits may (e.g., alternatively) be configured with a set of MOs (e.g., for MO skipping).

Search space monitoring occasions may be skipped (e.g., based on a determination). An explicit indication (e.g., a DCI) or implicit indication to skip one or more time instances may be received, for example, in a monitoring occasion of a search space (e.g., a search space (SS) with ID SS_k). The one or more time instances may be defined, for example, in terms of monitoring occasions and/or one or more (e.g., a combination of) slots, OFDM symbols, DRX cycles, frames, milliseconds/seconds, etc.

A WTRU may be configured and/or may receive an indication to monitor a set of search spaces, which may have at least one search space (e.g., other than SS_k). A determination as to which search spaces a received indication applies may be based on one or more (e.g., a combination) methods.

In examples, an indication to skip time instances (e.g., an indication to skip monitoring occasions) may apply (e.g., only apply) to the monitoring occasions of SS_k, which may indicate that a WTRU may monitor other (e.g., all other) configured and active search spaces without performing skipping.

Figure 7:
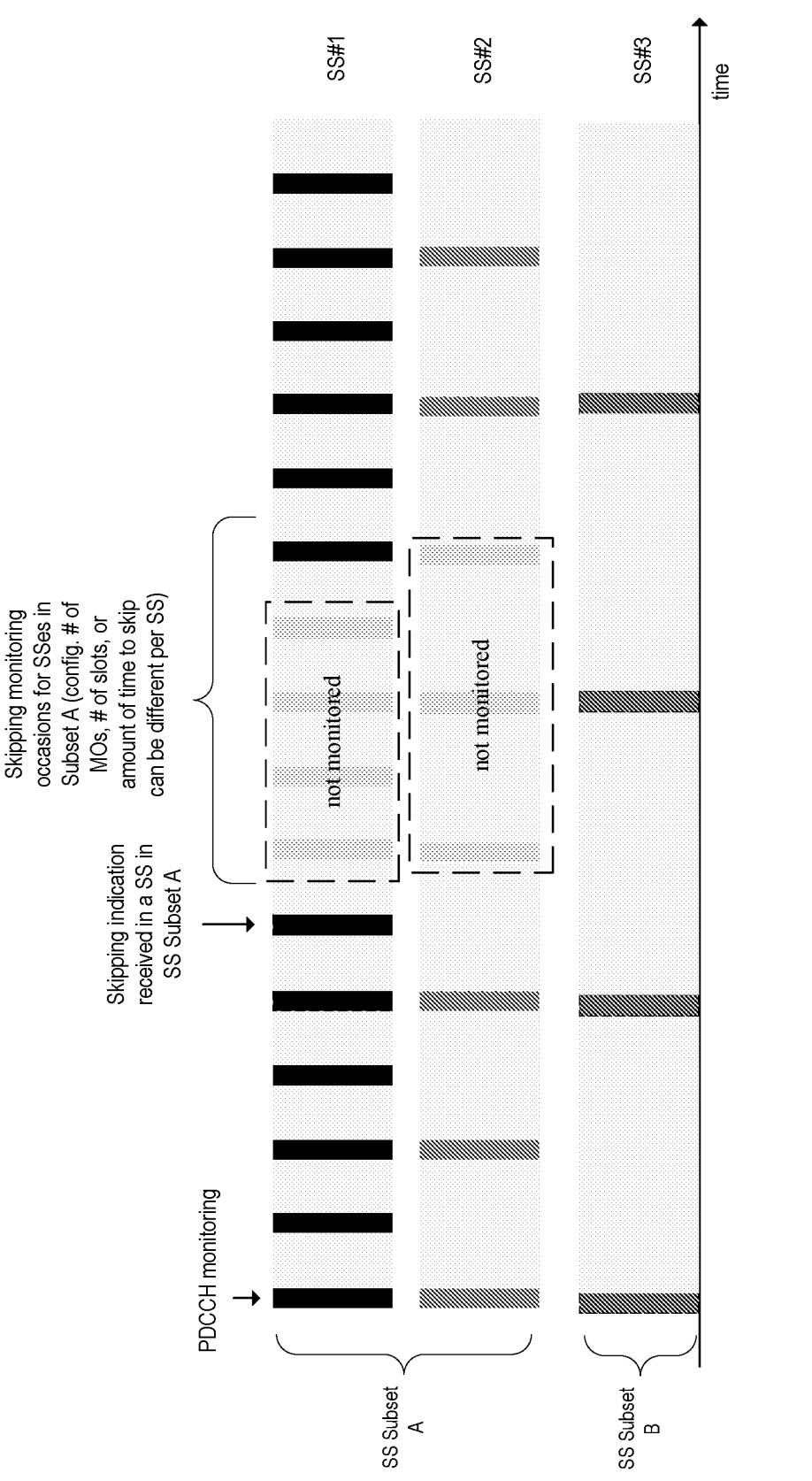
FIG. 7 is a diagram illustrating an example of applying a skipping indication.

In examples, an indication to skip time instances, (e.g., an indication to skip monitoring occasions) may apply to a group of SSs (e.g., see FIG. 7). Skipping may apply to a subset (e.g., a preconfigured subset) of search spaces (e.g., see FIG. 7). For example, a skipping indication received (e.g., by a WTRU) in a search space that belongs to SS_subset_A may apply to search spaces (e.g., all search spaces) in the SS_subset_A (e.g., skipping, such as skipping that has been configured for each search space in the subset, is to be applied for each search space in the subset if the WTRU receives the indication in one of the search spaces in the subset, see FIG. 7). The WTRU may skip a determined number of monitoring occasions, e.g., for every SS in the subset_A (e.g., a same number of MOs for each search space in the subset or a respective configured number of MOs for each respective search space of the subset, see FIG. 7).

Figure 5:
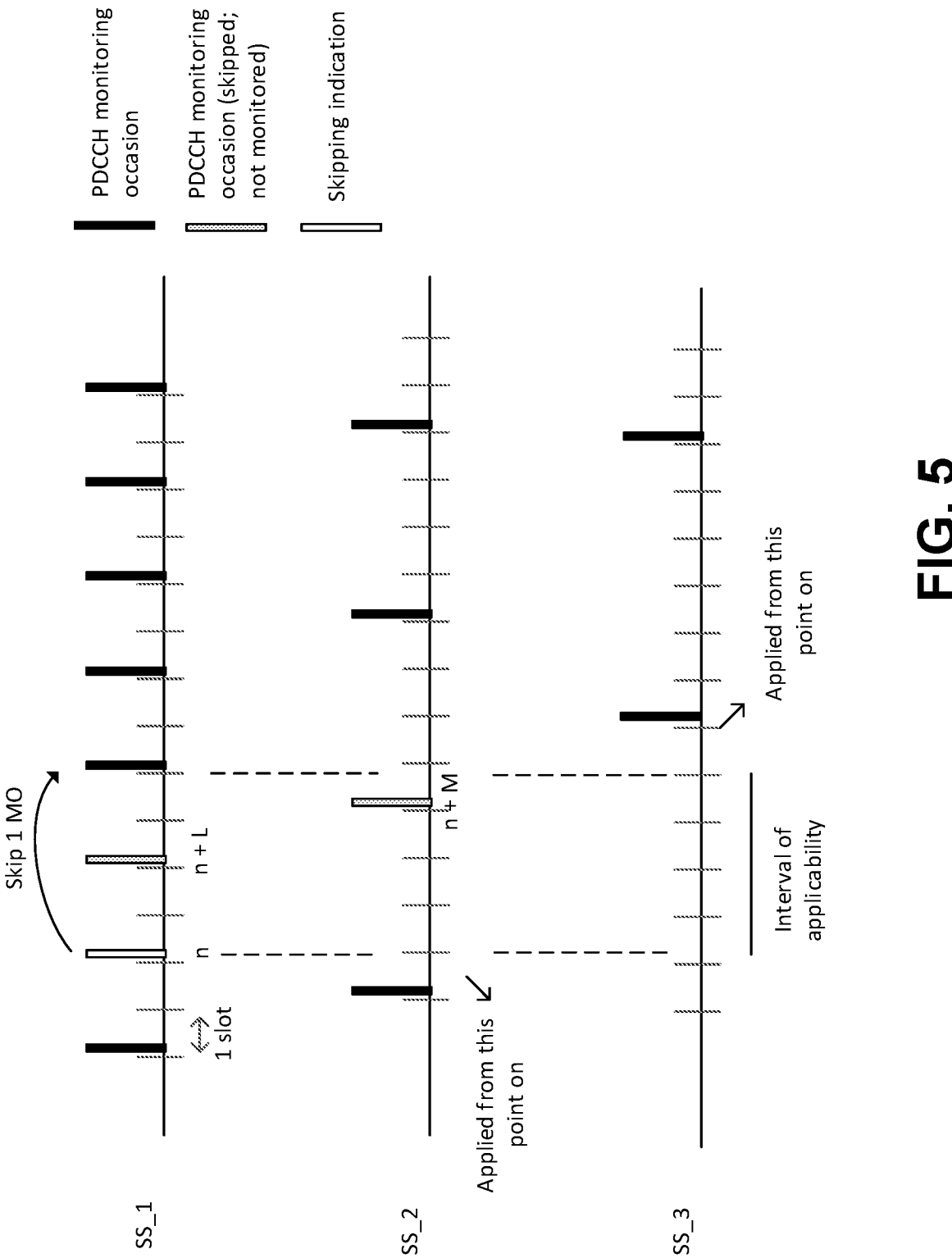
FIG. 5 is a diagram illustrating an example of applying a skipping indication.

FIG. 5 is a diagram illustrating an example of applying a skipping indication. Application of an indication may be determined, for example, by a periodicity/slot offset and/or other parameters of a search space configuration. In examples, a skipping indication may apply to a next monitoring occasion. For example (e.g., as shown by example in FIG. 5), first and second search spaces (e.g., SS_1 and SS_2 in FIG. 5) may be configured to be in a subset (e.g., a same subset), e.g., subset_A. An indication to skip a (e.g., one) monitoring occasion may be received in slot n (e.g., as shown by example in FIG. 5). The next monitoring occasion of SS_1 may be in slot n+L and the next monitoring occasion of SS_2 is in slot n+M (e.g., as shown by example in FIG. 5). A WTRU may apply the indication in the MOs for the corresponding search spaces.

In examples, an interval of applicability may be defined. A WTRU may skip a monitoring occasion, for example, if there is a monitoring occasion within the interval (e.g., the defined interval). A WTRU may not apply a skipping indication, for example, if there is not a monitoring occasion within the interval (e.g., the defined interval). For example, skipping may not apply to SS3 (e.g., as shown by example in FIG. 5), e.g., because SS3 does not have a monitoring occasion within the interval (e.g., the defined interval of applicability).

Skipping may apply to a type of SSs (e.g., that may be the same as SSk). Skipping may apply to one or more (e.g., all) WTRU-specific SSs (e.g., and may not apply to common search spaces), for example, if SS_k is (e.g., the same search space as) a WTRU-specific SS. In examples, a skipping indication may apply (e.g., only apply) to a WTRU-specific SS, but not to a common SS.

Skipping may apply to one or more SSs (e.g., all SSs) that may be configured with a DCI format (e.g, that may be the same as SS_k). Skipping may apply to one or more (e.g., all) SSs configured to monitor DCI format 1_1, for example, if SS_k is configured to monitor DCI format 1_1.

Skipping may apply to one or more (e.g., all) SSs configured with a CORESETpoolIndex and/or a CORESET ID (e.g., that may be the same as the SS_k).

Skipping may apply to a group of SSs whose periodicity may be larger than or smaller than a threshold.

Skipping may apply to a group of SSs whose monitoring duration may be larger than or smaller than a threshold.

Skipping may apply to one or more (e.g., all) the SSs that may be monitored in a given time interval, for example, the SSs monitored in slots [n to n+M] (e.g., as shown by example in FIG. 5). The variable n may be the slot where the indication is received and M may be a configurable value, e.g., in terms of slots, milliseconds, etc. in which the skipping indication is received.

A skipping indication may apply, for example, based on a DCI format. A skipping indication may apply to one or more (e.g., all) search spaces configured with the DCI format that carries the indication.

A skipping indication may apply, for example, based on an an search space identifier (SS ID). For example, a skipping indication may apply to one or more (e.g., all) SSs that are smaller than the detected SS ID. A skipping indication may not apply (e.g., with zero or more exclusions), for example, to a common search space.

In examples, the WTRU may determine at least one search space as the default search space(s). Although the following examples may be presented assuming one search space (e.g., only one search space) is the default search space, they may be similarly applicable to and consistent with the case where multiple search spaces may be determined to be the default search spaces.

The default search space may be determined using at least one of the following: (i) the default search space may be configured and re-configured by the higher layers (e.g., RRC); (ii) the default search space may be determined or re-determined in every DRX cycle (e.g., a long or short DRX cycle), or in every long DRX cycle, for example, on a condition of entering an ON duration and after starting an ON duration timer; (iii) the default search space may be determined or re-determined, e.g., every k DRX cycles, where k is a positive integer; (iv) the default search space may be determined as the search space whose monitoring occasion is present earliest in time during an ON duration (e.g., if more than one monitoring occasion is present use the earliest in time during an ON duration, for example in the first slot of the ON duration, and, if these monitoring occasions belong to more than one SS, then these SSs (e.g., all of these SSs) may be determined as the default, or less than all (e.g., one) of these SSs may be selected to be the default (e.g., based on the SS ID and/or the SS type)); (v) the default SS may be determined from the SS IDs and/or the SS types (e.g., the default SS may be a WTRU specific SS and may be the SS with a largest or smallest ID); or (vi) the default SS may be determined from a monitoring periodicity (e.g., the default SS may the SS with a largest or the smallest periodicity).

The WTRU may receive a skipping indication in a DCI where the DCI may be a scheduling DCI, e.g., such as DCI format 0_0, or 0_1. The DCI may be received while monitoring the default SS or another SS. In examples, the following may be applicable with or without a default SS being defined, e.g., there may not be a default SS. If the indication is received, the WTRU may skip, e.g., stop, monitoring the configured search spaces except the default search space. For example, assume that the DCI is configured with a 1-bit indication where bit "0" may mean "do not skip and/or resume monitoring" and bit "1" may mean "skip monitoring". If the WTRU receives the DCI and the indication is set to "1", then the WTRU may stop monitoring the set of the search spaces to which the indication applies. For example, the set may include the SSs (e.g., all of the SSs) except the default SS. For example, the set may include the WTRU specific SSs (e.g., all of the WTRU specific SSs) except the default SS. For example, the set may include a group of SSs configured by the higher layers that may or may not include a default SS. The DCI with the skipping indication may be received in a SS configured to monitor the DCI (e.g., any SS configured to monitor the DCI. The skipping may be applied after a certain time delay from the time the DCI is received.

The WTRU may receive an indication in a DCI while monitoring the default search space and/or another SS to which the skipping indication may not apply. If the indication is set to "0", the WTRU may resume monitoring the SSs that the previous skipping indication "1" has applied. The WTRU may (e.g., may also) resume monitoring the skipped search spaces e.g., after a timer expires (e.g., after a time duration expires). The timer may be started and/or re-started if a skipping indication set to "1" is received and the skipping indication applies to SSs (e.g., all SSs) configured with the DCI format that includes the skipping indication. For example, since the WTRU may not be expected to receive a DCI with the indication "0", it may use the timer to resume monitoring the SSs. If the WTRU receives a DCI with the indication set to "0" and there is not any SS to which a previous skipping indication "1" applies, then the WTRU may not skip monitoring any SSs.

In examples, the skipping indication may include more than one bit. The indication determined by each codepoint may be applicable to a different set of SSs. For example, assume the indication includes (e.g., two) bits. Then, as an example, the codepoints may be interpreted as follows: (i) 11: {skip monitoring SS-set-0, skip monitoring SS-set-1}; (ii) 10: {skip monitoring SS-set-0, do not skip monitoring SS-set-1 and/or resume monitoring SS-set-1}; (iii) 01: {do not skip monitoring SS-set-0 and/or resume monitoring SS-set-0, skip monitoring SS-set-1}; or (iv) 00: {do not skip monitoring SS-set-0 and/or resume monitoring SS-set-0, do not skip monitoring SS-set-1 and/or resume monitoring SS-set-1}.

In examples, SS-set-0 may include a group (e.g., a first group) of SSs and SS-set-1 may include a group (e.g., a second group) of SSs. A most significant bit (MSB) in the indication may be used to determine the indication for SS0 and a least significant bit (LSB) may be used to determine the indication for SS1. The index of the bit within the indication bits and the group of SSs that the bit applies may be configured by higher layers. The WTRU may (e.g., may also) resume monitoring the skipped search spaces e.g., after a timer (e.g., a time duration) expires and the timer may be started and/or re-started if a skipping indication set to "11" is received and the skipping indication applies to SSs (e.g., all SSs) configured with the DCI format that includes the skipping indication. The SSs that are left outside the configured SS sets to which the skipping indication applies may be monitored by the WTRU according to their SS parameters.

In examples, the indication bit field provided to the WTRU in the DCI format may be used by the WTRU to determine to switch between sets of search spaces to monitor.

The WTRU may receive an indication in a DCI where the DCI may be a scheduling DCI such as DCI format 0_0, or 0_1. The indication may be referred to as a switching indication. The DCI may be received while monitoring the default SS or another SS. In examples, the following may be applicable with or without a default SS being defined. If the switching indication is received, the WTRU may switch to the search space set that the indication points to. For example, assume that the DCI is configured with a 1-bit indication where bit "0" may mean "switch to SS-set-0" and bit "1" may mean "switch to SS-set-1". If the WTRU is monitoring SS-set-0 and receives the DCI with the switching indication set to "1", the WTRU may stop monitoring SS-set-0 and switch to SS-set-1 (e.g., start monitoring SS-set-1), e.g., after a specific time delay (e.g., the WTRU may start monitoring SS-set-1 in the next slot). If the WTRU is monitoring SS-set-1 and receives the DCI with the switching indication set to "0", the WTRU may stop monitoring SS-set-1 and switch to SS-set-0 (e.g., start monitoring SS-set-0), e.g., after a specific time delay. If the WTRU is already monitoring the SS set indicated in the switching indication field, it may continue monitoring the current SS set and may not perform SS switching. If a default SS is defined, the default SS may be monitored regardless of the switching indication, e.g., the indication may not apply to the default SS. For example, if the indication is set to "1", then the WTRU may monitor the default SS and SS-set-1. The SS sets (e.g., the SSs included in the set) may be configured by higher layers.

In examples, SS switching may be interpreted as activating or de-activating an SS set where activating may mean "to monitor and/or start monitoring" and de-activating may mean "to not monitor and/or stop monitoring." If a 1-bit indication is used, it may be assumed that an SS set (e.g., one of the SS sets) is activated and the other SS set is implicitly being deactivated, or vice versa.

The indication may include more than one bit and the indication determined by each codepoint may be applicable to a different set of SSs. For example, assume the indication includes (e.g., two) bits. Then, as an example, the codepoints may be interpreted as follows: (i) 11: {activate SS-set-0, activate SS-set-1}; (ii) 10: {activate SS-set-0, de-activate SS-set-1}; (iii) 01: {de-activate SS-set-0, activate SS-set-1}; or (iv) 00: {de-activate SS-set-0, de-activate SS-set-1}.

The WTRU may resume monitoring the de-activated search spaces, e.g., after a timer (e.g., a time duration) expires, and, the timer may be started and/or re-started if a switching indication set to "00" is received.

In examples, the SSs that are left outside the configured SS sets to which the switching and/or activation indication applies, may be monitored by the WTRU according to their SS parameters. For example, assume the WTRU is configured with 10 SSs with indices IDs 0-to-9. The SS-set0 may include SSs 1-to-3, and SS-set-1 may include SSs 4-7. The SSs {0, 8, 9} may be monitored by the WTRU, e.g., regardless of the contents of the switching indication.

The interpretation of the indication bitfield (e.g., whether the indication is to be used by the WTRU to determine skipping/no-skipping or switching/activating-deactivating) may be configured by higher layers. For example, an RRC parameter skipping-or-switching may be defined and configured by the RRC.

FIG. 6 is a diagram illustrating an example of an application delay. There may be a time gap, for example, between when a skipping indication is received and when the indication is applied (e.g., as shown by example in FIG. 6). A time gap may be positive. An offset may be positive or negative. Time gap determinations (e.g., methods) may be (e.g., similarly) applicable to methods that indicate an operation other than skipping, e.g., search space switching, SS monitoring periodicity change, etc.

K0min may be, for example, a minimum applicable scheduling offset for downlink. An application delay may be equal to, for example, a minimum scheduling offset, or K0min+offset1, e.g., where offset1 may be a positive or a negative value (e.g., time gap=k0min+offset). Time gap may be 4, for example, if k0min is 5 and offset is −1. Offset values may be fixed. The K0min and the offset1 values may be defined, for example, in terms of slots.

An application delay may be determined, for example, based on the subcarrier spacings of PDCCH and PDSCH. An application delay may be determined (e.g., if the subcarrier spacings of PDCCH and PDSCH are different), for example, in accordance with Eq. 1:

$$\text{Application Delay} = K0min \frac{2^{\mu PDCCH}}{2^{\mu PDSCH}} + \text{offset1} \qquad \text{Eq. 1}$$

K2 min may be, for example, a minimum applicable scheduling offset for an uplink. For example, an application delay may be equal to the minimum scheduling offset, or K0min+offset2, e.g., where offset2 may be a positive or a negative value. The K2 min and the offset2 values may be defined, for example, in terms of slots. The offset2 value may be added, for example, if (e.g., only if) K0min is below a threshold.

An application delay may be determined, for example, based on the subcarrier spacings of PDCCH and PUSCH. An application delay may be determined (e.g., if the subcarrier spacings of PDCCH and PUSCH are different), for example, in accordance with Eq. 2:

$$\text{Application Delay} = K2min \frac{2^{\mu PDCCH}}{2^{\mu PDSCH}} + \text{offset2} \qquad \text{Eq. 2}$$

An application delay may be a function of K0min and K2 min, e.g., min(K0min, K2 min) or max(K0min, K2 min). An offset3 may be added to a determined application delay. A min(K0min, K2 min) or a max(K0min, K2 min) may be (e.g., similarly) scaled with the corresponding y values, for example, if subcarrier spacings of PDCCH and PDSCH are different.

An application delay may be set to K (e.g., a PDSCH-to-HARQ_feedback timing indicator field in a DCI format), or K+offset 3. An application delay may be set to K, for example, if a HARQ feedback is ACK. A WTRU may not choose not to apply a skipping indication and may wait for the next indication, for example, if there is at least one NACK. An indication may be applied after the retransmission(s) are acknowledged.

Offset values (e.g., offset1, offset2, offset3, or offset4) may be added, for example, if (e.g., only if) a determined application delay is below a threshold. The offset1 value may be 1 slot, for example (e.g., for Eq. 1), if K0min is 0. For example, K0min may equal 2 slots and an indication may be received in slot n. A WTRU may start applying the indication in slot n+2 (e.g., the WTRU ceases monitoring the applicable SSs from slot n+2). For example, K0min may equal 0 slots and an indication may be received in slot n. A WTRU may start applying the indication in slot n+1 (offset1=1 slot), e.g., the WTRU ceases monitoring the applicable SSs from slot n+1.

Search space periodicity may be determined. A periodicity parameter of a search space may be determined by a WTRU with an explicit and/or an implicit indication.

In examples, signaling in a control channel may be used for an explicit indication (e.g., bits transmitted in a DCI and/or SCI). A WTRU may be configured, for example, with a search space with multiple periodicity values. A number of bit(s) within a DCI may be used to indicate one of the multiple periodicity values. A WTRU may (e.g., may be expected to) apply an indicated periodicity value, for example, if (e.g., when) the WTRU monitors the search space. One of the periodicity values may be configured, for example, as a default value. A WTRU may (e.g., may be expected to) apply the default value, for example, before receiving an indication. A WTRU may apply a default value, for example, if an ON duration timer (e.g., a time duration of an ON duration) starts and may apply the indicated value, for example, if (e.g., when) received.

An indication may be applied, for example, starting from a first monitoring occasion after an application delay is applied. An application delay may be computed, for example, using methods (e.g., similar to methods described herein). For example, a current monitoring periodicity may be 4 slots and an indication may be received in slot n to change the periodicity to 8 slots. In examples (e.g., with an application delay equal to 2 slots), a WTRU may monitor for a PDCCH transmission, for example, in slots n+4, n+4+k8 (e.g., k may be an integer). In examples (e.g., with an application delay equal to 5 slots), a WTRU may monitor for a PDCCH transmission, for example, in slots n+4, n+8, n+8+8k (e.g., k may be an integer).

A periodicity change may be indicated, for example, implicitly. In examples, one or more of the following may apply. A periodicity change may be indicated, for example, based on one or more of the following: a PDCCH reception, a timer (e.g., a time duration) expiry, and/or a power saving state change.

In examples, a reception of PDCCH may trigger a change of periodicity, e.g., from P1 to P2. For example, a WTRU may start an ON duration timer with a default P1 value. Periodicity may be changed to P2, for example, if a PDCCH is received. A change in periodicity may commence, for example, from the first monitoring occasion after the ON duration timer expires. The monitoring occasion may be determined, for example, based on P1. In examples, one or more of the following constraints may apply to a periodicity change triggered by receiving a PDCCH transmission: (i) a triggering PDCCH transmission may be received in a specific time interval (e.g., after an ON duration, but while an inactivity timer may be running); (ii) a PDCCH transmission may be restricted to a specific SS (e.g., based on a SS ID and/or SS type); (iii) a PDCCH transmission may have a specific DCI format to trigger the periodicity change; and/or (iv) a PDCCH transmission may be received in a specific CORESET and/or a BWP and/or a CORESET with a specific CORESETpoolIndex parameter.

In examples, a timer expiry may trigger a change of periodicity, e.g., from P2 to P1 or vice versa. Periodicity may fall back to P1 and/or P2, for example, after an inactivity timer and/or a HARQ timer or a newly defined timer expires. In examples, a configured periodicity may be used during an ON duration. A periodicity for an SS may be changed (e.g., halved) while the inactivity timer is running, for example, if an SS is monitored but a PDCCH transmission is not detected during an ON duration. Behavior may be configured, for example, per SS. An applied periodicity for an SS may revert back to a default periodicity, for example, if a PDCCH transmission is received for the SS while an inactivity timer is running.

In examples, a power saving state change may trigger a change of periodicty. A monitoring periodicity may be increased (or vice versa), for example, if a WTRU is configured with a DCI with a "Minimum applicable scheduling offset indicator" bit, and if the bit indicates (e.g., to the WTRU) to use a larger K0min/K2 min.

A determination may be made (e.g., based on an indication) to select search spaces for a periodicity change. An indication may be received, for example, in a monitoring occasion of a first search space. An indication may be applicable, for example, to the first search space and at least another search space. In examples, there may be a preconfigured set of periodicities, for example, for an applicable search space (e.g., each applicable search space). An indication may be used to select one of multiple periodicities (e.g., preconfigured periodicities). For example, there may be a periodicity-1 (P1) value and a periodicity-2 (P2) value configured for a applicable search space (e.g., each applicable search space). An indication may be used to select P1 or P2 for a applicable search space (e.g., each applicable search space). In examples, the P1 and P2 values may be common for more than one search space.

In examples, an indication may apply (e.g., only apply) to the monitoring occasions of SS_k (e.g., an SS in which the indication is received).

In examples, an indication may apply to a group of SSs. An indication may apply, for example, to a subset of search spaces (e.g., preconfigured search spaces). For example, an indication received in a search space that belongs to an SS_subset_A may apply to search spaces (e.g., all search spaces) in the SS_subset_A. A WTRU may change the periodicity of SSs (every SS) in the subset_A to the indicated values.

An indication may apply, for example, to a type of SSs that may be the same as SS_k. An indication may apply to WTRU-specific SSs (e.g., all WTRU-specific SSs) and may not apply to common search spaces, for example, if SS_k is (e.g., the same as) WTRU SS. An indication may apply (e.g., only apply) to a WTRU-specific SS but not to a common SS.

An indication may apply to SSs (e.g., all SSs) that may be configured, for example, with a DCI format that may be the same as SS_k. An indication may apply to SSs (e.g., all SSs) that may be configured to monitor DCI format 1_1, for example, if SS_k is configured to monitor DCI format 1_1.

An indication may apply to SSs (e.g., all SSs) that may be configured, for example, to monitor the same CORESET as SS_k and/or the same CORESETpoolIndex.

An indication may apply to a group of SSs whose periodicity may be larger than or smaller than a threshold.

An indication may apply to a group of SSs whose monitoring duration may be larger than or smaller than a threshold.

An indication may apply to search spaces (e.g., all search spaces) that may be configured, for example, with a DCI format that may be the same as the SS that carries the indication.

An indication may apply to a group of SSs, for example, based on an SS ID. For example, an indication may apply to SSs (e.g., all SSs) whose IDs may be smaller, larger, and/or equal to an ID of the SS where the indication is received.

A blind decoding reduction may be implemented. In examples, a number or a maximum number of blind decodings performed by a WTRU (e.g., per slot) may be (e.g., dynamically) changed (e.g., reduced). A change may be triggered, for example, by an implicit and/or an explicit indication. Blind decoding may be used interchangeably with PDCCH monitoring candidates and monitoring candidates. A number of blind decodings may be used interchangeably with a number of CCEs for channel estimation. A maximum number of blind decodings may be used interchangeably with a maximum number of CCEs for channel estimation. A maximum number of blind decodings and/or a maximum number of CCEs for channel estimation may be a limit within a time window (e.g., slot, slots, symbol, and/or symbols). A maximum number of blind decodes may be (e.g., dynamically) changed, for example, by (e.g., explicit or implicit) signaling.

L1 (e.g., PDCCH) and/or L2 (e.g., MAC CE) may be used, for example, to signal a number (e.g., a maximum number) of blind decodes that a WTRU may (or must) perform (e.g., per subcarrier spacing). In examples, control information (e.g., downlink control information (DCI) and/or sidelink control information (SCI)) may (or may be used to) indicate a number (e.g., a maximum number) of blind decodes that a WTRU may apply. Control information may be transmitted, for example, in a common search space. Control information may contain k bits, for example, to indicate a number (e.g., a maximum number) of blind decodes, where k may be an integer greater than zero (e.g., 6), and may be configurable. An indicated number (e.g., an indicated maximum number) of blind decodes may be applicable, for example, after an application delay, which may be computed, for example, using one or more methods (e.g., described herein). In examples, an indication may indicate a value m (e.g., 1, 0.5, 0.25, etc.) that may scale a number (e.g., a default number) of blind decodes, for example, to compute the number (e.g., of blind decodes) that may be applied after the indication is received.

An indicated number (e.g., an indicated maximum number) of blind decodes may be valid, for example, until a timer (e.g., a time duration) expires and/or a new indication is received. The timer may be configured for a blind decode-related purpose or may be a multi-purpose (e.g., a reusable) timer. A WTRU may set the indicated number (e.g., the indicated maximum number) to a default value, for example, when an inactivity timer expires.

In examples, a maximum number of blind decodes may be associated with a subset of search spaces. A WTRU may set a number (e.g., a maximum number) of blind decodes to a number associated with a subset, for example, if the WTRU receives an indication to use a search space subset (e.g., by indication of switching to the subset). For example, a WTRU may be configured with multiple (e.g., two) search spaces sets (e.g., SS1 and SS2) and an associated number (e.g., an associated maximum number) of blind decodes (e.g., 20 and 24). A WTRU may apply the maximum number of blind decodes of 20, for example, if the WTRU receives an indication to use SS1. A WTRU may apply the maximum number of blind decodes of 24, for example, if the WTRU receives an indication to use SS2.

In examples, a number (e.g., a maximum number) of blind decodes may be associated with a CORESET and/or a CORESETpoolIndex.

For example, a WTRU may be configured with multiple (e.g., two) CORESET groups (e.g., C1 and C2) and an associated number (e.g., a maximum number) of blind decodes of 20 and 24. A WTRU may apply the maximum number of blind decodes of 20, for example, if the WTRU receives an indication to use C1. A WTRU may apply the maximum number of blind decodes of 24, for example, if the WTRU receives an indication to use C2.

In examples, a set of aggregation levels may be configured for a search space and a subset within the configured set of aggregation levels (ALs) may be indicated to a WTRU. A WTRU may (e.g., determine to) use indicated ALs, for example, when monitoring the search space. An indication may be indicated to the WTRU by the WTRU receiving an explicit signaling (e.g., L1 signaling and/or MAC signaling) and/or an implicit signaling.

In examples, multiple sets of aggregation levels may be configured for a search space. A (e.g., one) of the multiple sets of ALs may be indicated to a WTRU. The WTRU may (e.g., determine to) use the indicated set. For example, a first search space may be configured with ALs 1, 2, 4, and 8. The ALs may be grouped into two subsets, e.g., {1, 2} and {4, 8}. The WTRU may receive an indication, for example, to use ALs {1,2}, e.g., while monitoring the first search space. The indication may stay valid, for example, until a new indication is received or a timer (e.g., a time duration) expires.

In examples, multiple PDCCH candidates may be configured, e.g., for a given aggregation level of a search space. A candidate (e.g., one candidate) of the multiple candidates may be indicated to a WTRU. The WTRU may (e.g., determine to) use the indicated number of PDCCH candidates, for example, while monitoring the associated search space with the AL. The indication may be achieved, for example, by the WTRU receiving an explicit signaling (e.g., L1 signaling and/or MAC signaling) or an implicit signaling.

In examples, a number (e.g., a maximum number) of blind decodings and/or a number (e.g., a maximum number) of CCEs for channel estimation may be increased and/or decreased by a certain number in an indication (e.g., each indication). For example, a multiple (e.g., two) bit indicator in a DCI (e.g., a scheduling DCI for PUSCH and/or PDSCH) may indicate whether a number (e.g., a maximum number) is decreased, increased, and/or maintained the same, e.g., for the next monitoring occasion. In examples, one or more of following may apply.

An indicator may indicate, for example, at least one of following: (i) a limit (e.g., a maximum number of blind decoding and/or a maximum number of CCEs for channel estimation) may be increased by N1, for example, after a time gap (e.g., X symbols, X slots, next MO); (ii) a limit may be decreased by N2 after a time gap (e.g., where N1 and N2 may be the same); and/or (iii) a limit may remain the same.

An indicator may indicate an accumulation value for a limit.

A number of bits for an indicator may be configured, for example, based on one or more of the following: (i) multiple of N1 values and/or N2 values may be used, configured, or supported, for example, if the number of bits is larger than a threshold; (ii) the indicator may indicate multiple (e.g., two) states (e.g., decrease by N2 and remain the same), for example, if the number of bits is one; or (iii) the limit may not be changed (e.g., dynamically), for example, if the number of bits is zero.

An indicator may be signaled in a group common PDCCH. For example, an RNTI (e.g., a PS-RNTI) may be configured for a group of WTRUs. A group common DCI may (or may be used to) signal a set of indicators.

A limit (e.g., a maximum number) may be reset to a default value (e.g., a initial value configured), for example, if a timer (e.g., a time window) expires (e.g., the timer may be expired, for example, if a WTRU doesn't receive a PDCCH (or DCI) transmission within the time window), and/or if a counter (e.g., a number of an event occurrence) reached a maximum (e.g., a WTRU may increase the counter in each MO, for example, if the WTRU doesn't receive a PDCCH (or DCI) in the MO).

In examples, a WTRU may receive an indication (e.g., dynamically) of a CCE aggregation level (e.g., a maximum CCE aggregation level) of an MO for PDCCH monitoring. For example, a WTRU may be configured with a search space with aggregation levels (ALs), such as AL={1, 2, 4, 8, 16}. The WTRU may receive a CCE aggregation level (e.g., a maximum CCE aggregation level) of 4. The WTRU may skip monitoring PDCCH candidates, for example, with AL=8 or AL=16 in the search space. A configured AL (e.g., each configured AL) may have one or more PDCCH candidates to monitor for a search space. In examples, one or more of following may apply. A CCE AL (e.g., a maximum CCE AL) may be received by a WTRU in an MO, for example, earlier than the target MOs. The target MOs may be the MOs in which the maximum CCE AL may be used. A scheduling DCI for PDSCH and/or PUSCH may include a CCE AL indicator (e.g., a maximum CCE AL indicator). A DCI may be used, for example, to indicate a maximum CCE AL indicator. A DCI may indicate (e.g., explicitly) target MOs for a maximum CCE AL indicator to apply (e.g., time offset of a starting MO, time window for target MOs).

Active search space management may be provided. In examples, a WTRU may be configured with a first set of search spaces to monitor. The first set of search spaces may comprise one or more subsets of search spaces. A WTRU may down-select and keep active a first subset of search spaces from the first set of search spaces. The search spaces outside the selected subset may be set to an inactive state. An active search space may be monitored by the WTRU and an inactive search space may not be monitored by the WTRU. The active and inactive status of the search spaces may be valid, for example, within a time interval (e.g., a specific time interval). The WTRU may set the configured set (e.g., all of the configured set) of search spaces to an active state, for example, when the time interval expires. For example, a WTRU may set a subset of the search spaces to active state (e.g., after entering a DRX ON period). The active/inactive status of the search spaces may be valid, for example, until the end of the DRX active time.

Selection of an active and/or inactive search space subset may be triggered, for example, by at least one of the following events: reception of a channel transmission (e.g., a PDCCH transmission).

A WTRU may be configured with a set of N search spaces, which may comprise K subsets of search spaces. A subset (e.g., one subset) may comprise one or more search spaces. The WTRU may receive a PDCCH transmission in a (e.g., one) of the monitored search space subsets (e.g., search space with ID SS_k in subset K), e.g., while monitoring a set of search spaces. The WTRU may deactivate remaining search spaces in the set and continue monitoring SS_k (e.g., only SS_k). In examples, the WTRU may continue monitoring search spaces in subset K, which may contain SS_k.

A PDCCH transmission may be a first PDCCH transmission detected in a predefined time window. For example, a PDCCH transmission may be a first PDCCH transmission detected upon entering a DRX ON period.

Search space(s) to keep active (e.g., from a list of SSs that may correspond to detected PDCCH transmissions) may be selected based on a rule, for example, if two or more first PDCCHs are detected in the same time window (e.g., two PDCCHs detected in the same slot upon entering the DRX ON period). In examples, the following may be set to active state (e.g., search spaces (e.g., all search spaces) that may be included in subset(s) (e.g., including the selected search spaces(s)) may (e.g., alternatively) be kept active): (i) SSs (e.g., all SSs) in the list; (ii) at least one randomly selected SS from the list; (iii) the SS in the list with the smallest SS ID or largest SS ID); (iv) the SS in the list detected on a CORESET with a smaller or larger CORESET ID than other CORESETs associated with the SSs in the list; (v) the SSs associated with one or more specific CORESETs; (vi) the SS in the list with the smallest or largest periodicity; and/or (vii) the SS with the shortest or largest duration parameter.

SS(s) may be kept active, for example, based on search space ID. Search spaces whose IDs are smaller than and/or equal to or larger than and/or equal to the first detected SS may be kept active.

A PDCCH may be the first n PDCCHs detected in a time interval (e.g., the first two PDCCHs detected in a predefined time interval), or (e.g., all) PDCCHs detected in a predefined time interval.

In examples, a time interval may be determined, for example, by at least one timer (e.g., by at least one time duration) defined for a DRX cycle. A WTRU may monitor a set of multiple search spaces, for example, if (e.g., when) an ON duration timer is running. An inactivity timer may start, for example, as a result of detection of a first PDCCH transmission. The WTRU may monitor search spaces corresponding to the first PDCCH transmission detected during the ON duration, e.g., during the duration when the inactivity timer is running. For example, the WTRU may monitor (e.g., only monitor) the search space of the monitoring occasion in which the first PDCCH transmission was detected.

A second PDCCH may be detected in a monitoring occasion of a second search space during an ON duration, for example, if the WTRU monitors multiple search spaces during the ON duration. A WTRU may (e.g., on a condition that the inactivity timer is restarted) (i) add the second search space to the list to be monitored (e.g., until the inactivity timer expires), and/or (ii) remove the first search space from the list and keep (e.g., only keep) the second search space. A WTRU may keep one or more (e.g., all or k, such as the last k) (detected) search spaces in the list, e.g., where k may be an integer greater than zero. The value of k may be configured and/or signaled. In examples, a subset of the search spaces corresponding to the PDCCHs detected during the ON duration may be selected, for example, using a predetermined rule (e.g., one or more of the plurality of rules disclosed herein).

A selection of active or inactive (e.g., monitored or not monitored) search space may be based on, for example, an association to a CORESET. In examples, the determination of a search space to be monitored or not may be based on a property of the CORESET ID of the search space (e.g., the CORESET ID).

In examples, at least one of the SSs configured with CORESET_m may be kept active, for example, if the (e.g., first) PDCCH transmission received during the ON duration is received in CORESET_m. In examples, a first n PDCCHs received in a predefined time window may be received in a first set of CORESETs. Search spaces associated with the first set of CORESETs may be kept active. The determination may be based on a parameter, such as a pool index (CORESETPoolIndex).

A selection of active or inactive (e.g., monitored or not monitored) search space may be based on, for example, a TCI state configuration. In examples, the determination of a search space to be monitored or not may be based on a TCI state configuration of the CORESET of the search space. A WTRU may detect a PDCCH transmission on a CORESET with a TCI state, for example, during an ON duration. CORESETs with the same TCI state (only CORESETS with the same TCI state) may be monitored. In examples, a subset may include search spaces configured with CORESETs of multiple serving cells, for example, if a WTRU is configured with multiple serving cells. The CORESETs may include CORESETs with a given index p of a set of serving cells. The set of serving cells may be defined, for example, by "simultaneousTCI-CellList."

Other (e.g., alternative and/or additional) conditions may be imposed, for example, based on a SS type and/or DCI format(s) to monitor in an SS. For example, Common Search Spaces (CSS) may be (e.g., may always be) kept active and monitored, e.g., while a ON duration and/or inactivity timers may be running. Selective activation and/or deactivation may apply (e.g., only apply) to WTRU-specific search spaces (WTRUSS) and/or SSs that may be configured with only specific DCI formats.

A selection of active or inactive (e.g., monitored or not monitored) search space may be based on, for example, a traffic type. A WTRU may choose a subset of active search spaces, for example, based on a traffic type or a related parameter (e.g., QoS parameters, latency requirements, etc.).

In examples, search spaces to be kept active during an active time may be determined, for example, by a wake-up signal (WUS). CORESET(s) on which the wake-up signal may be detected may determine active search spaces. For example, search spaces that may be configured with the CORESET(s) may be activated during an active duration that may be associated with a wake-up signal. An explicit indication may be provided. A WUS may indicate (e.g., explicitly indicate) a set of search spaces to monitor during an associated active time.

A selection of active or inactive (e.g., monitored or not monitored) search space may be based on, for example, a DRX type. A set of the initial search spaces and/or search space subsets may be determined, for example, based on a DRX type. In examples, search spaces (e.g., all search spaces) may be monitored, for example, if (e.g., when) a WTRU is in a long DRX and methods to select a subset of active search spaces may apply to when the WTRU is in a short DRX, or vice versa. In examples, different sets of search spaces may be configured for different DRX cycles.

The size of an active search space set may be increased, for example, by adding more search spaces to the search space set or may be reduced, for example, by deactivating at least one of the search spaces from the set. Activation and/or deactivation may be performed by the WTRU, for example, based on an indication (e.g., an explicit indication) from a gNB and/or other indication (e.g., an implicit indication). In examples, an SS may be deactivated, for example, if a PDCCH transmission is not detected within a monitored SS in a given amount of time. A space may be deactivated for the remainder of a DRX cycle, for example, if a PDCCH transmission is not detected in a search space during an ON duration (e.g., when the ON duration timer is running).

One or more bits in a control information (e.g., downlink control information (DCI); sidelink control information (SCI)) may indicate whether and/or which search spaces to add to the active set. A WTRU may be configured with an initial and/or default SS set to monitor. A group of SSs may be configured. Group IDs may be assigned to the groups. DCI received in a PDCCH transmission within an SS in the initial/default set may indicate activation of a group (e.g., the group of SSs that may be monitored by the WTRU). A DCI received in a PDCCH transmission within an SS in the initial/default set may (e.g., similarly) indicate de-activation of a group (e.g., the group of SSs that may not be monitored by the WTRU). A DCI with indication bits may be transmitted in (e.g., only in) a PDCCH monitored in an initial/default SS set. An initial/default set of SSs may be configured, for example, by a gNB and/or may be (e.g., implicitly) determined by a WTRU. In examples, SSs that may be configured to monitor a specific DCI format (e.g., a DCI that may contain SS activation/de-activation bits) may be determined, for example, to constitute an initial/default set.

In examples, one or more (e.g., the same) DCI bit(s) that may be used to indicate search space set activation/deactivation may indicate one or more other activities or functions (e.g., cross-slot scheduling). A first set of search spaces may be activated, for example, if a WTRU is configured with a DCI with the "Minimum applicable scheduling offset indicator" bit, and if the bit indicates (e.g., to the WTRU) to use a larger K0min/K2 min. A second set of search spaces may be activated, for example, if the bit indicates to use a smaller K0min/K2 min.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed:
1. A wireless transmit-receive unit (WTRU) comprising:
a processor configured to:
  monitor for a downlink transmission in a first monitoring occasion of a first search space;
  monitor for the downlink transmission in a second monitoring occasion of a second search space, wherein the first search space and the second search space belong to a search space subset;
  receive the downlink transmission in the second monitoring occasion of the second search space, wherein the downlink transmission comprises a skipping indication;
  determine, based on the first search space and the second search space belonging to the search space subset and reception of the downlink transmission in the second monitoring occasion of the second search space, that the skipping indication applies to the first search space and the second search space; and
  based on the reception of the downlink transmission in the second monitoring occasion of the second search space that comprises the skipping indication and the determination that the skipping indication applies to the first search space and the second search space, monitor the first search space after a first skipping duration and the second search space after a second skipping duration, wherein the first skipping duration is different from the second skipping duration.

2. The WTRU of claim 1, wherein the processor is further configured to receive information that indicates the first search space, a first monitoring occasion pattern associated with the first search space, the first skipping duration associated with the first search space, the second search space, a second monitoring occasion pattern associated with the second search space, and the second skipping duration associated with the second search space.

3. The WTRU of claim 1, wherein the processor is further configured to skip monitoring of the first search space during the first skipping duration and skip monitoring of the second search space during the second skipping duration.

4. The WTRU of claim 1, wherein a third search space belongs to the search space subset, wherein the processor is further configured to monitor the third search space after a third skipping duration based on the reception of the downlink transmission in the second monitoring occasion of the second search space that comprises the skipping indication, and wherein the first skipping duration is a same duration as the third skipping duration.

5. The WTRU of claim 2, wherein the first monitoring occasion is associated with the first monitoring occasion pattern and the second monitoring occasion is associated with the second monitoring occasion pattern.

6. The WTRU of claim 1, wherein the downlink transmission is a physical downlink control channel (PDCCH) transmission that comprises the skipping indication.

7. The WTRU of claim 1, wherein the downlink transmission is not received in the first monitoring occasion of the first search space.

8. The WTRU of claim 1, wherein the first skipping duration is a first number of monitoring occasions, a first amount of time, or a first number of slots, and wherein the second skipping duration is a second number of monitoring occasions, a second amount of time, or a second number of slots.

9. A method implemented in a wireless transmit-receive unit (WTRU), the method comprising:
  monitoring for a downlink transmission in a first monitoring occasion of a first search space;
  monitoring for the downlink transmission in a second monitoring occasion of a second search space, wherein the first search space and the second search space belong to a search space subset;

receiving the downlink transmission in the second monitoring occasion of the second search space, wherein the downlink transmission comprises a skipping indication;

determining, based on the first search space and the second search space belonging to the search space subset and reception of the downlink transmission in the second monitoring occasion of the second search space, that the skipping indication applies to the first search space and the second search space; and based on the reception of the downlink transmission in the second monitoring occasion of the second search space that comprises the skipping indication and the determination that the skipping indication applies to the first search space and the second search space, monitor the first search space after a first skipping duration and the second search space after a second skipping duration, wherein the first skipping duration is different from the second skipping duration.

10. The method of claim 9, further comprising receiving information that indicates the first search space, a first monitoring occasion pattern associated with the first search space, the first skipping duration associated with the first search space, the second search space, a second monitoring occasion pattern associated with the second search space, and the second skipping duration associated with the second search space.

11. The method of claim 9, further comprising skipping monitoring of the first search space during the first skipping duration and skipping monitoring of the second search space during the second skipping duration.

12. The method of claim 9, wherein a third search space belongs to the search space subset, wherein the method further comprises monitoring the third search space after a third skipping duration based on the reception of the downlink transmission in the second monitoring occasion of the second search space that comprises the skipping indication, and wherein the first skipping duration is a same duration as the third skipping duration.

13. The method of claim 10, wherein the first monitoring occasion is associated with the first monitoring occasion pattern and the second monitoring occasion is associated with the second monitoring occasion pattern.

14. The method of claim 9, wherein the downlink transmission is not received in the first monitoring occasion of the first search space.

15. The method of claim 9, wherein the first skipping duration is a first number of monitoring occasions, a first amount of time, or a first number of slots, and wherein the second skipping duration is a second number of monitoring occasions, a second amount of time, or a second number of slots.

\* \* \* \* \*